United States Patent [19]
Litchholt et al.

[11] Patent Number: 5,503,919
[45] Date of Patent: Apr. 2, 1996

[54] GARMENTS COMPRISING AN ELASTOMERIC ADHESIVE FOAM

[75] Inventors: John J. Litchholt, Harrison; Richard W. Lodge, Cincinnati, both of Ohio

[73] Assignee: The Procter & Gamble Company, Cincinnati, Ohio

[21] Appl. No.: 249,763

[22] Filed: May 26, 1994

Related U.S. Application Data

[62] Division of Ser. No. 85,537, Jun. 30, 1993, Pat. No. 5,342,858.

[51] Int. Cl.$^6$ ............................. B32B 2700; A61M 31/00
[52] U.S. Cl. .................... 428/286; 428/284; 428/913; 604/369
[58] Field of Search ............................. 428/284, 286, 428/913; 604/369

[56] References Cited

U.S. PATENT DOCUMENTS

| | | | |
|---|---|---|---|
| 3,912,665 | 10/1975 | Spitzer et al. | 260/2.5 E |
| 3,912,666 | 10/1975 | Spitzer et al. | 260/2.5 E |
| 4,036,673 | 7/1977 | Murphy et al. | 156/71 |
| 4,229,548 | 10/1980 | Sattlegger et al. | 521/110 |
| 4,259,220 | 3/1981 | Bunnelle et al. | 260/27 BB |
| 4,418,123 | 11/1983 | Bunnelle et al. | 428/517 |
| 4,423,161 | 12/1983 | Cobbs, Jr. et al. | 521/73 |
| 4,543,099 | 9/1985 | Bunnelle et al. | 604/385 A |
| 4,731,066 | 3/1988 | Korpman | 604/366 |
| 4,778,631 | 10/1988 | Cobbs, Jr. et al. | 261/128 |
| 4,970,242 | 11/1990 | Lehman | 521/78 |
| 4,978,570 | 12/1990 | Heyn et al. | 428/231 |
| 5,037,416 | 8/1991 | Allen et al. | 604/385.1 |
| 5,056,034 | 10/1991 | Rucki et al. | 364/510 |
| 5,089,190 | 2/1992 | Trevathan et al. | 264/45.9 |
| 5,171,239 | 12/1992 | Igaue et al. | 604/385.2 |
| 5,196,000 | 3/1993 | Clear et al. | 604/385.2 |

FOREIGN PATENT DOCUMENTS

| | | |
|---|---|---|
| 424295 | 4/1991 | European Pat. Off. . |
| 0526868A2 | 2/1993 | European Pat. Off. . |
| 5-123360 | 5/1993 | Japan . |

OTHER PUBLICATIONS

"Handbook of Adhesives," 2d, I. Skeist (Van Nostrand Reinhold Co. 1977), pp. 304–330.
"The Chemistry of Hot Melt Adhesives for the Nonwovens Industry;" Mark Alper (Findley Adhesives Inc.).

Primary Examiner—Morton Foelak
Attorney, Agent, or Firm—Loretta J. Henderson; Bart S. Hersko; Steven W. Miller

[57] ABSTRACT

An elastomeric, hot-melt adhesive foam is disclosed. The adhesive foam preferably comprises an elastomeric, hot-melt adhesive material formed from (a) about 15% to about 60%, by weight of the adhesive material, of an A-B-A block copolymer, in which the A block is derived from styrene and the B block is derived from butadiene or isoprene.

(b) about 30% to about 70%, by weight of the adhesive material, of an aromatic modified hydrocarbon resin which associates with both the B block and A blocks of the A-B-A block copolymer, and (c) 0 to about 30%, by weight of the adhesive material, of a processing oil.

The proportions of the components (a), (b), and (c) are selected such that the elastomeric, hot-melt adhesive material has a viscosity of less than about 200,000 centipoise at 325° F. and an elastomeric retention value of at least 75%. The adhesive material is preferably pressure-sensitive so as to allow lamination of the solidified foam comprising the adhesive material with components of absorbent articles without the need for external bonding agents.

Also disclosed is a method of making the elastomeric adhesive foam and of elasticizing structures and absorbent articles with the foam. The adhesive foam and structures incorporating same are particularly useful in disposable absorbent articles such as diapers, training pants, incontinent devices, and the like.

25 Claims, 3 Drawing Sheets

GARMENTS COMPRISING AN ELASTOMERIC ADHESIVE FOAM

This is a divisional of application Ser. No. 08/085,537, filed on Jun. 30, 1993 now U.S. Pat. No. 5,342,858.

FIELD OF THE INVENTION

The present invention is directed to an elastomeric composition more particularly an elastomeric adhesive foam composition. The foams are particularly useful as an elastic component in disposable absorbent articles such as diapers, incontinent devices, training pants, and the like.

BACKGROUND OF THE INVENTION

Numerous absorbent articles for use in the absorption of bodily fluids and discharges such as menses, urine, Feces and the like are known. Such absorbent articles have incorporated elastic components to improve the fit of the article. For example, U.S. Pat. No. 4,978,570, issued to Heyn, et al. on Dec. 18, 1990 is directed to a disposable diaper having an elastic waist provided with a foam strip to cushion stresses of the elastic waistband in the waist area. The composite waistband consists of an elastomeric strip and a foam strip. The use of a foam tends to provide desirable properties in the article, e.g., compressibility, resilience, and/or thickness. However, such articles suffer from the disadvantage that the foam requires an external bonding agent to construct the article which adds to the cost of the article. In addition, such foams generally must be cut to fit the article as desired such that waste may be generated, thereby further increasing the cost of the articles incorporating the foam. Finally, foams such as the polyurethane foams disclosed therein are prepared on a separate line for later incorporation into the article. This need to prefabricate the foam also adds to the cost of the article.

Other prefabricated foams have been used in the art, e.g., natural rubber foams. In addition to the disadvantages of the need to prefabricate the foam, cut the foam to fit, and to use an external bonding agent, the natural rubber foams are also relatively expensive.

The art also discloses elastomeric adhesive compositions which may be combined into a laminar construction having elastic properties. For example, U.S. Pat. No. 5,032,120, issued to Freeland, et al. on Jul. 16, 1991, discloses an improved leg cuff and a hot-melt elastomeric composition designated 198–338 (Findley Adhesives, Inc., of Wauwatosa, Wis.) as being particularly well suited for the construction of the central laminate of a diaper. Other elastomeric adhesive compositions and constructions employing same have been disclosed in U.S. Pat. Nos. 4,418,123 (Nov. 29, 1983); 4,259,220 (Mar. 31, 1981); and 4,543,099 (Sep. 24, 1985); each issued to Bunnelle, et al.

The adhesive compositions noted above possess a multiplicity of shortcomings which have detracted from their usefulness, particularly in disposable absorbent articles. For example, the adhesive composition 198–338 has a thin film holding strength, i.e., an elastomeric retention when elongated, which rapidly decreases over time, thereby reducing the usefulness of this particular adhesive composition in disposable absorbent garments. In addition, this adhesive composition possesses an unusually long recovery time, i.e., the time it takes for the adhesive to retract to its original length following elongation. The elastomeric adhesive formulations disclosed in the Bunnelle, et al., patents possess a viscosity in excess of one million centipoise at 325° F. Consequently, these adhesive compositions can only be applied by utilizing very expensive manufacturing machinery such as extruders and the like. Further, this high viscosity slows the speed of production lines using conventional manufacturing machinery, thereby increasing the manufacturing costs of disposable garments employing these compositions. In addition, the adhesive compositions of Bunnelle, et al. do not appear to possess the level of adhesion which is necessary for the construction of disposable absorbent garments. Moreover, these compositions do not appear to provide for a convenient and expeditious means by which adhesion can be adjusted without affecting their elastomeric properties.

U.S. Pat. No. 4,731,066, issued to Korpman on Mar. 15, 1988, discloses an elastic laminated disposable diaper having a liquid-impermeable backing which is produced from an initially molten extruded elastic film. The film formers can be extruded as a foam as well as a continuous film, and include pressure-sensitive adhesive materials. However, the pressure-sensitive adhesives disclosed by Korpman would be expected to possess a very high viscosity even at elevated temperatures. Consequently, these compositions, like the compositions of the foregoing Bunnelle patents, would be expected to require very expensive manufacturing equipment (e.g., extruders) and to suffer from low production speeds using conventional equipment. In addition, the structures of Korpman are limited by the extensibility of the backing and/or facing fabric.

Thus there is a continuing need to elasticize absorbent articles in a manner which provides the advantages of elastic components comprising foams without the disadvantages of elastic components known heretofore. Thus, it is an object of the present invention to provide foamed elastic components utilizing less expensive raw materials. It is a further object of the present invention to provide an elastomeric foam that can be formed on-line and that does not require, or requires only reduced amounts of external bonding agents and/or more economical bonding agents for incorporation into absorbent articles. It is a further object of the present invention to provide such foams which may be used to elasticize entire panels of a disposable garment, or alternatively, discrete areas thereof. It is a further object of the present invention to provide a method of elasticizing absorbent articles in a direct manner without waste. Thus it is an object of the present invention to provide a foam which can be formed on-line in a pattern or shape. Another object of the present invention is to provide elastic foams which may be formed into a sheet or other shapes utilizing relatively inexpensive manufacturing techniques or devices, and further which may be formed in a relatively short production time. Yet another object of the present invention is to provide foams having properties desirable for use in absorbent articles, e.g., a relatively high elastomeric retention, a relatively short recovery time, and good adhesion to components typically used therein.

It is a further object of the present invention to provide elastic structures having both a low basis weight and physical properties suitable for use in absorbent articles, e.g., a specified caliper (i.e., loft or thickness), compressibility, resilience, and force of elongation. Yet another object of the present invention is to provide an absorbent article having sustained dynamic fit about the waist of the wearer and improved resistance to leakage during use.

These and other objects of the present invention will be more readily apparent when considered in reference to the following description and when taken in conjunction with the accompanying drawings.

SUMMARY OF THE INVENTION

The present invention relates to an elastomeric, hot-melt adhesive foam (also referred to herein as "elastomeric adhesive foam," or "adhesive foam") comprising an elastomeric, hot-melt adhesive material. The adhesive material preferably comprises:

(a) about 15% to about 60%, by weight of the adhesive material, of an A-B-A block copolymer, in which the A block (i.e., end block) is derived from styrene and the B block (i.e., mid block) is derived from butadiene or isoprene;

(b) about 30% to about 70%, by weight of the adhesive material, of an aromatic modified hydrocarbon resin which associates with both the mid block and end blocks of the A-B-A block copolymer; and (c) 0 to about 30%, by weight of the adhesive material, of a processing oil.

The proportions of the block copolymer, aromatic modified hydrocarbon resin, and processing oil are preferably selected to provide an elastomeric, hot-melt adhesive material having a viscosity of less than about 200,000 centipoise at 325° F. and an elastomeric retention value of at least about 75%.

The invention also relates to a method of making the elastomeric adhesive foam. The method of making the foam of the present invention involves melting the adhesive material, mixing a gas with the adhesive material under pressure to form a solution of the gas in the adhesive material, reducing the pressure to cause evolution and/or expansion of the gas to form a foam, and stabilizing the foam by causing the adhesive material to solidify. The relatively low melt-viscosity of the adhesive material which is used to form the foam provides desirable processing times and the ability to form foams having desired physical properties, e.g., caliper and cell structure.

The adhesive foams of the present invention tend to provide a desirable elastic retention value. Thus the adhesive foams of the present invention typically have an elastomeric retention value of at least about 65%. Further, it is believed that, by decreasing the mount of di-block copolymer (i.e., A-B block copolymer) in the adhesive material of the foam, the elastomeric retention and tensile strength of the foam may be increased. Thus, it is preferred to use block copolymers which are substantially fully coupled, i.e.. which are substantially 100% A-B-A block copolymer (i.e., tri-block). In a preferred embodiment, the total concentration of styrene in the block copolymer may vary in a wide range of from about 15% to about 50%, more preferably about 25% to about 50%, or the total weight or the copolymer. A styrene concentration in the latter range provides an adhesive material which displays a particularly desirable viscosity.

The foams of the present invention are preferably pressure-sensitive. In a preferred embodiment, the pressure-sensitive foam has a cell structure such that the foam remains compressible upon repeated application of compressive forces (i.e., the foam is resilient). Thus such foams are preferably characterized by closed cells.

The present invention further relates to elastic structures and absorbent articles incorporating the elastomeric adhesive foam, and methods of making same. Relative to non-foamed elastomers, the foams of the present invention tend to provide improved structural rigidity, thereby decreasing the tendency of an absorbent article incorporating the foam to fold and/or crease. In addition, the foams tend to provide increased resiliency and compressibility so as to provide an improved fit of an absorbent garment incorporating the adhesive foam. In addition, the adhesive foams tend to distribute forces over a greater area (i.e., lower modulus), thereby reducing the tendency for red marking and increasing the comfort of the wearer of such absorbent articles. In a preferred embodiment, the foams of the present invention are made on-line and integral with an absorbent article to elasticize entire panels, or alternatively, discrete areas (e.g., side panels) of the article.

BRIEF DESCRIPTION OF THE DRAWINGS

While the specification concludes with claims particularly pointing out and distinctly claiming the invention, it is believed that the invention will be better understood from the following drawings taken in conjunction with the specification.

DESCRIPTION OF THE PREFERRED EMBODIMENTS

Figure 1:
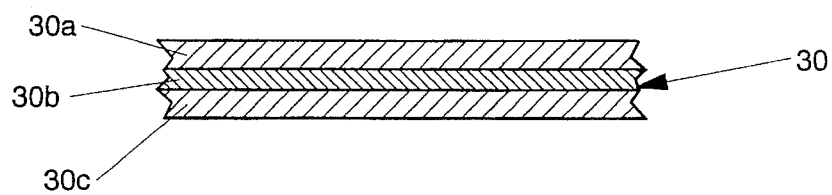
FIG. 1 is a fragmentary vertical sectional view of a laminate comprising the elastomeric adhesive foam of the present invention.

The elastomeric adhesive foams of the present invention are formed from an elastomeric, hot-melt adhesive material (also referred to herein as "elastomeric adhesive material" or "adhesive material"). The adhesive material is preferably pressure-sensitive.

By "elastomeric," "elastomer," "elastic," etc., it is meant materials which are able to be stretched to at least twice their original length and to retract very rapidly to approximately their original length when released.

"Adhesive" as used herein means a substance capable of holding materials together by surface attachment (adhesion). Adhesion typically results from (a) mechanical bonding and/or (b) chemical forces, including either primary covalent bonds or polar secondary forces between the adhesive and the surface (adherend). The particular mechanisms of bonding generally depend on the surface characteristics, including the porosity, of the adherend.

"Hot-melt adhesives" are those which are melted to cause flow and which are solidified upon cooling after contacting the adherend(s), generally under moderate pressure. Hot-melts can be characterized as solidifying by physical processes upon cooling after being applied as a hot liquid.

"Melt," "molten," etc. as used herein includes but is not limited to the thermodynamic melt state in which crystals of a substance are in equilibrium with the liquid phase at a given temperature and pressure. These terms are also meant to include an apparently homogeneous, liquid condition. As used herein, "solidified" refers to both solid, semi-solid, and tacky states.

As used herein, "pressure-sensitive adhesives" refers to adhesives which are viscous polymer melts at room temperature (about 20° C. to about 25° C.), which polymers are caused to flow and contact the adherend surface by applied pressure. When the pressure is released, the viscosity is high enough to withstand the stresses produced by the adherends. Thus, a pressure-sensitive adhesive can be characterized as a material which is permanently liquid but which forms a strong bond to a surface when slight pressure is applied to cause flow of the adhesive.

An important property of a pressure-sensitive adhesive material is "tack," which is defined as a viscosity at room temperature which is sufficiently low to permit good surface contact yet high enough to resist separation under stress, typically on the order of $10^4$–$10^6$ centipoise. The lack of pressure-sensitive adhesives can be determined by ASTM test methods D2979 ("Pressure Sensitive Tack of Adhesives Using an Inverted Probe Machine") and D3121 ("Tack of Pressure-Sensitive Adhesives by Rolling Ball"), each test being incorporated herein by reference.

By "foam," it is meant a dispersion of a gas in the molten elastomeric adhesive material or the solidified adhesive material (the latter is also referred to herein as a "permanent foam"). The dispersion results in a structure which can be described as membranes or struts of adhesive material which are interconnected so as to form cells. By "closed cell" it is meant that a cell is completely enclosed by a membrane of the elastomeric adhesive material. Closed cell foams are generally impermeable by way of transport through the cells. In contrast, an "open cell" is interconnected to at least one other cell. Typically, open cell foams are permeable via the cellular structure.

The elastomeric, hot-melt adhesive material contains a relatively high molecular weight hot-melt elastomer. The hot-melt elastomer is preferably an elastomeric block copolymer having relatively non-elastomeric end blocks and an elastomeric mid block which is designated as an A-B-A block copolymer. A-B-A block copolymers are generally known in the art. For example, such copolymers are described in *Handbook of Adhesives*, 2d Ed., Irving Skeist, Van Nostrand Reinhold Co. (1977), pp 304–330, incorporated herein by reference. The A block is typically an alkenylarene polymer derived from a monomer such as styrene. The B block is typically a polymer of a conjugated aliphatic diene monomer of from 4 to 6 carbon atoms or a linear alkene monomer of from 2 to 6 carbon atoms. Suitable dienes include butadiene, isoprene, and the like. Suitable alkenes include ethylene, butylene, propylene, and the like. Where the A block is styrene-based and the B block is butadiene- or isoprene-based, the block copolymers are referred to as S-B-S copolymers and S-I-S copolymers, respectively.

The block copolymers may be linear, branched or radial. In a linear copolymer the respective monomeric moieties are arranged in an alternating sequence such that the copolymer has the general configuration A-B-A. A branched copolymer is essentially a linear polymer in which branching may occur randomly anywhere in the rubber copolymer chain. A radial block copolymer is characterized and distinguished from the branched linear copolymer in having blocks radiating from a central core. Radial block copolymers may be designated $(A-B)_n X$, wherein X is a polyfunctional atom or molecule and in which each (A-B) radiates from X in a way that A is end block ("n" refers to the number of such radiating (A-B) portions).

The preferred elastomeric adhesive material of the foam of the present invention contains A-B-A block copolymer in an amount of about 15% to about 60% by weight of the adhesive material. The A block is preferably derived from styrene, alpha-methyl styrene, vinyl toluene, or mixtures thereof. More preferably, the A block is polystyrene or a styrene based polymer, and most preferably polystyrene. The B block is preferably derived from butadiene or isoprene. I.e., the copolymer is preferably an S-I-S or S-B-S copolymer.

In a preferred embodiment, the total concentration of styrene in the block copolymer may vary in a wide range of from about 15% to about 50% of the total weight of the copolymer. More preferably, the block copolymer has a styrene concentration in the range of about 25% to about 50% of the total weight of the copolymer. Such concentrations surprisingly provide adhesive materials having particularly desirable viscosities when compared with compounds manufactured from related A-B-A copolymers which have less than 25% styrene by weight of the copolymer.

Additionally, it has been found to be advantageous to utilize block copolymers which are substantially fully coupled, i.e., the copolymer is or is substantially 100% tri-block (i.e., contains low levels of or no diblock). Preferably, the copolymer contains greater than 90% triblock, more preferably at least about 95% triblock, even more preferably at least about 99% triblock, most preferably about 100% triblock. It is believed that a relationship exists between the force which is expressed as the elastomeric retention of the adhesive material used in the present invention and the coupling efficiency of the A-B-A block copolymer of the adhesive material. In general, decreasing the amount or diblock tends to increase the elastomeric retention (at a given time interval) and the tensile strength of the adhesive material and thus of the adhesive foam.

The S-I-S and S-B-S copolymers may be a linear copolymer in which "S" is a non-elastomeric polymeric block derived from styrene, and "I" or "B" is an elastomeric polymeric block derived from isoprene or butadiene, respectively. In a preferred embodiment, the total concentration of the styrene monomer in such copolymers ranges from about 15% to about 50%, more preferably from about 25% to about 50%, of the total weight of the copolymer. Preferably the copolymer is substantially fully coupled. Suitable S-I-S block copolymers of this type are commercially available from the Dexco Chemical Company under the product or trade designations Vector 4211, Vector 4411, and Vector 4111, respectively. Another suitable S-I-S block copolymer is available from the Shell Chemical Company under the trade designation RP6407. Vector 4211 and 4411 have respective styrene contents of about 29% and 44% of the total weight of the copolymer; Vector 4111 and RP6407 each have a styrene content of about 17% of the total weight of the copolymer.

The S-I-S and S-B-S copolymer may alternatively be a teleblock copolymer. A teleblock copolymer includes radial copolymers characterized by molecules having at least three branches which radially branch out from a central hub, each of the branches having polystyrene terminal blocks and a polyisoprene or polybutadiene segment in the center. Teleblock copolymers also include branched copolymers having a branched polymerized isoprene or butadiene midblock with a polystyrene terminal block at the end of each branch. In a preferred embodiment, the total concentration of the styrene monomer in such teleblock copolymers ranges from about 15% to about 50%, more preferably from about 25% to about 50%, of the total weight of the copolymer. Preferably, the teleblock copolymer is substantially fully coupled.

Mixtures or the above-identified block copolymers may also be used. In addition, the polymer marketed under the trade designation "Stereon" (manufactured by the Firestone Chemical Co.) may be used herein. The elastomeric adhesive material may also include some diblock (e.g., A-B copolymer), although this will not generally be desired for reasons previously stated. Thus, the adhesive material may contain diblock and/or triblock copolymers such as are known in the art.

The elastomeric adhesive material used for preparing the foam also comprises an aromatic modified hydrocarbon resin, preferably in an amount of about 30% to about 70% by weight or the adhesive material. The aromatic modified hydrocarbon resin associates with both the mid block and the end blocks of the tri-block copolymer. Thus, the resin is chemically compatible with both the end and mid blocks such that physical phase separation of the polymer and the resin does not occur to a significant extent.

The aromatic modified hydrocarbon resin tends to increase the pressure-sensitivity (and tack) of the adhesive material and thus of the adhesive foam, at least up to a certain level of addition relative to the block copolymer. Up to a level of about 50% –60% resin, the adhesive material tends to increase in pressure-sensitivity with an increase in resin. Above about 60% resin, the adhesive tends to decrease in pressure-sensitivity and may become relatively hard and glassy. In addition, as the pressure-sensitivity increases, the elastomeric retention of the adhesive material tends to decrease until the glassy phase is reached. Similarly, the tensile strength of the adhesive material and foam may decrease with increasing levels of resin relative to the copolymer, at least until the adhesive material becomes glassy. The aromatic modified hydrocarbon resin also tends to decrease the viscosity of the adhesive materials The aromatic modified hydrocarbon resin may be selected from the group consisting of aromatic petroleum hydrocarbon resins and hydrogenated versions thereof. Particularly suitable resins of this type are commercially available from the Exxon Chemical Company under the trade designation "ECR 165A" and "ECR 165C." Other aromatic modified hydrocarbon resins are styrenated terpenes, such as those materials which are marketed under the trade designation "Zonatac 105 Lite" (manufactured by the Arizona Chemical Company).

The elastomeric adhesive material also preferably comprises a processing oil. Preferably, the oil is present in amounts of up to about 30% by weight of the adhesive material. The oil provides some level of viscosity control and further operates as a diluent. The viscosity of the adhesive material tends to decrease as the amount of processing oil is increased. In addition, the processing oil tends to contribute to the pressure-sensitivity (and tack) of the adhesive material and foam. However, increasing levels of oil also tend to decrease the elastomeric retention and tensile strength of the adhesive material and foam.

The oil is preferably compatible with the other components of the adhesive material such that a homogeneous mixture is formed, i.e, the mixture does not phase separate to a significant extent. In a preferred embodiment, a paraffinic or napthenic white processing oil such as are known in the art is used. A commercially available white processing oil suitable for use herein is available from the Witco Chemical Company as "Witco Plastics Oil 380." Another suitable oil is "Kaydol," which is also available from the Witco Chemical Company.

In a preferred embodiment, the proportions of the block copolymer, aromatic modified hydrocarbon resin, and processing oil are selected to such that the adhesive material of which the adhesive foam is comprised has a viscosity of less than about 200,000 centipoise at 325° F. and an elastomeric retention of at least about 75%. In another embodiment, the adhesive material preferably also has a tensile strength of at least about 5 psi at 40% elongation at 25° C. The proportions can be selected in accordance with the pervious description of the foregoing components. It is further noted that the elastomeric retention and tensile strength tend to increase with increasing levels of the copolymer.

The proportions of the block copolymer, aromatic modified hydrocarbon resin, and processing oil are also preferably selected in accordance with the foregoing description such that the adhesive material is pressure-sensitive (thus, the adhesive material has tack). Pressure-sensitivity may advantageously allow for the elasticization of absorbent articles without the need for external bonding agents, depending on the level of adhesion to a given substrate.

It may be desirable to balance the pressure-sensitivity of the adhesive material with the cell structure in order to provide a resilient foam. It is believed that, the higher the tack, the greater the tendency of the foam to lose compressibility, resulting in reduced caliper and a change in other physical properties. It is believed that the tack may be sufficient to cause open cell walls to cohere upon compression of the foam, resulting in a change in cell structure and a consequent loss of compressibility and other physical properties. It is further believed that this tendency can be offset by varying the open/closed cell ratio (the percent of open cells: the percent or closed cells; hereinafter referred to as the "cell ratio") of the elastomeric adhesive foam. In general, for a given elastomeric adhesive material, tile smaller the cell ratio (i.e., the greater the number of closed cells relative to open cells), the less the tendency of the foam to lose compressibility. The greater the tack, the more desirable it will usually be to have a substantially closed cell structure. Modification of the cell ratio is further described herein.

The elastomeric adhesive material of which the adhesive foam is comprised also preferably comprises a compound which functions as an antioxidant and/or thermal stabilizer (hereinafter referred to as stabilizer). The stabilizer tends to protect the block copolymer, and thereby the adhesive material and adhesive foam incorporating same, from the deleterious thermal and/or oxidative effects which are frequently experienced by other similar copolymers during the manufacture and application of adhesive compositions utilizing same, as well as in the ordinary use of the final manufactured product. As should be understood, such degradation usually manifests itself by the deterioration of the adhesive material in appearance, physical properties and performance.

Particularly useful stabilizers for use herein include the high molecular weight hindered phenols and multi-functional phenols, such as sulfur and phosphorous-containing phenols. The hindered phenols are well known to those skilled in the art. Exemplary stabilizers of this type may be purchased commercially under the trade designation "Irganox 1010" from the Ciba-Geigy Company. Other useful stabilizers include "Cyanox LTDP," manufactured by American Cyanamid, and "Mark 273," manufactured by the Wilco Chemical Company. The performance of these stabilizers may be enhanced by utilizing in conjunction therewith: (1) synergists, e.g., thiodipropionate esters and phosphites; and/or (2) chelating agents and metal deactivators, e.g., ethylenediamineletraacetic acid (EDTA), salts of EDTA, and di-salicylapropylene-di-imine. The stabilizer is typically used in an amount of less than about 5% by weight of the copolymer, preferably less than about 2% by weight of the copolymer, more preferably less than about 1% by weight of the copolymer.

In a preferred embodiment, a nucleating agent is incorporated into the elastomeric adhesive material. The nucleating agent tends to increase the foam growth rate and also influences the size distribution of the resultant bubbles. It is generally desirable to minimize the foam growth time (i.e., to increase the foam growth rate) in order to enable processing on conventional converting equipment such as used in the manufacture of disposable absorbent articles. The foam growth rate refers to the rate of change of volume of the foam (e.g., due to gas evolution and/or expansion out of or in the gas/adhesive material solution described herein); the foam growth time refers to the time required to achieve about 99% of final caliper once the solution is dispensed. For a given diffusion condition, the foam growth time lends to decrease with a decrease in viscosity. Thus, the growth time tends to decrease with an increase in temperature and/or with compositional variations as described herein (although the utility of such temperature increases is limited by the decomposition temperature or the adhesive material). The foam growth time is typically less than about 2 seconds, depending on the process temperature. For one system, the foam growth time was about 0.5 seconds.

In the absence or a nucleating agent, the gas/adhesive material solution will typically need to be supersaturated in order to drive the gas evolution to a degree sufficient to form a foam. Nucleation or gas bubbles may then occur according to known principles, e.g., due to surface imperfections in the apparatus used to form the foam. Such nucleation is expected to result, however, in random bubble formation. Any bubbles which so form tend to be larger in size and fewer in number than when a nucleating agent is used. In addition, the foam growth time tends to to be somewhat slower than when a nucleating agent is used.

The nucleating agent tends to indirectly increase the foam growth rate. Generally, when a nucleating agent is used, the bubbles will immediately form and begin to grow when the pressure of the system has been reduced to at least the critical solubility pressure, defined herein. It is believed that the growth involves both diffusion of dissolved gas molecules toward a gas phase in the bubbles and expansion of the gas bubbles. It is also believed that the nucleating agent in sufficient quantity decreases the mean diffusion path between gas bubbles since the agent induces a greater concentration of bubbles in the solution, thereby increasing the rate of gas diffusion out of solution (evolution) upon a sufficient decrease in pressure. As a result, the foam growth rate is increased.

The rate of diffusion and thus of foam growth may also be increased by a decrease in viscosity of the gas/adhesive solution. A decrease in viscosity also tends to increase the foam growth rate by decreasing the flow resistance of adhesive melt surrounding the gas bubbles, thereby enhancing expansion of the gas bubbles. Expansion of the bubbles is believed to occur until the internal pressure of the bubbles is balanced by the surface tension of the bubble in the solution. A decrease in viscosity and resultant increase in foam growth rate may be achieved by increasing the temperature of the gas/adhesive solution and through compositional variations as previously described.

The nucleating agent also tends to increase the modulus of the adhesive foam. It is believed that the nucleating agent tends to provide a relatively monodisperse cell distribution resulting in a higher modulus foam. Use of a nucleating agent typically results in a foam having a greater number of cells, which cells will be of a smaller size, relative to foams comprising adhesive material in which no nucleating agent is used. For a given amount of nucleating agent and gas, the smaller the particle size of the nucleating agent (i.e., the greater the number of nucleating agent particles), the greater the number of resultant gas bubbles and cells, the more uniform the cell structure, and the fewer the number or defects (e.g., random large cells having relatively thin, weak cell walls).

Nucleating agents such as are known in the art, e.g., $CaCO_3$ and $TiO_2$, may be used. The Nucleating agent is typically used in an amount of about 0.5% to about 1% by weight of the adhesive material. The specific nucleating agent level will generally be balanced with the effect of the agent on the viscosity of the adhesive material. The viscosity of the adhesive material tends to increase with increasing levels of the nucleating agent.

The elastomeric adhesive material from which the foam of the present invention is made may be prepared using any of the techniques known in the art for conventional elastomeric adhesives. For example, the oil and stabilizer components, when used, may be placed in a jacketed mixing kettle, preferably a jacketed heavy duty mixer of the Baker-Perkins or Day type which is equipped with rotors. Thereafter, the temperature of the mixture is raised to a temperature sufficient to melt the various adhesive components, typically about 250° F. to about 350° F. As should be understood, the precise temperature to be used in this step will depend on the melt point of the particular ingredients. After this initial mixture has been healed to the desired temperature, the mixture is blanketed in a non-reactive gas, e.g., $CO_2$, at a slow flow rate, and the aromatic modified hydrocarbon resin is slowly added. When the resin is melted, the block copolymer is added to the mixture. The resultant adhesive composition is agitated thereafter until the block copolymer is completely melted. The temperature may be increased to melt the copolymer; typically a temperature in the range of about 250° F. to about 350° F. is sufficient. A vacuum may be applied to remove any entrapped air. The elastomeric adhesive material may then be recovered for later use in making the foam of the present invention. Alternatively, the mixing kettle used to make the adhesive material is connected to equipment for making the foam so as to enable a continuous process.

The foams of the present invention are generally formed by first melting the elastomeric adhesive material. The adhesive is typically melted by heating to a temperature of about 250° F. to about 400° F., preferably about 325° F. to about 375° F. Generally the temperature will be maximized in order to increase the flow rate of the material, however, the temperature and the time held at the temperature should be selected so as to avoid polymer degradation. The molten elastomeric adhesive material is then mixed under sufficient pressure with a suitable gas to form a solution of the gas in the elastomeric adhesive material (a foamable composition is formed). Upon a sufficient reduction in pressure, the gas evolves from and/or expands in the solution in the form of bubbles in the molten adhesive material to form a structure comprising the elastic adhesive material and cells (a foam is formed). The structure is stabilized, e.g., by cooling the adhesive material, to form a foam structure which is relatively permanent at room temperature.

The gas is preferably non-reactive, i.e., it is non-oxidative or does not promote oxidation. Thus various gases may be employed in the present invention, including nitrogen, carbon dioxide, inert gases such as argon or helium, and mixtures of any of the foregoing gases. Although oxidative gases such as air may be used, this is not preferred and would usually require the use of a stabilizer and/or steps to dry the air in order to prevent or minimize oxidation of the elastomeric adhesive material. Preferably, a non-reactive gas is selected which has substantial solubility in the adhesive material at the temperature and pressure employed. Preferably, nitrogen is used.

It is often desired to minimize the foam density and thus to maximize the amount of gas in the solution for economic and other reasons, e.g., to maximize caliper. Thus, the amount of the gas which is incorporated into the molten elastomeric adhesive material may be selected so as to provide a foam having a desired density or caliper. However, since the foam modulus tends to decrease with decreasing foam density (and thus with increasing gas loading) the desired density should be balanced with the desired modulus. Typically, at least about 25 volume %, more preferably at least about 50 volume % of gas is incorporated into the elastic adhesive material. About 65 volume % to about 75 volume % gas tends to provide a suitable balance of foam density, caliper, and modulus. The resultant foams typically have, respectively, a void volume of at least about 20–about 25%, at least about 40–about 50%, about 50–about 65%; and about 60–about 75%.

The term "solution" is used herein to describe the molten elastomeric adhesive containing the gas supplied under a pressure above atmospheric pressure and sufficient to cause the gas to rapidly evolve and/or expand when the pressure is reduced to atmospheric pressure such that a foam is formed. The solution is a relatively homogeneous mixture of the gas and molten adhesive material, the gas molecules being dissolved and/or dispersed in the adhesive material.

The pressure under which the adhesive material and gas is maintained to form the solution is preferably at least as great as the critical solubility pressure of the particular gas in the elastic adhesive composition at a given temperature. As used herein, "critical solubility pressure" means the pressure at which the gas in solution will begin to evolve out of the solution. The critical solubility pressure is typically the same as or near to the thermodynamic equilibrium solubility pressure.

In addition, the critical solubility pressure tends to follow Henry's law, i.e., the weight (or volume) of the gas dissolved in a given amount of the adhesive material is directly proportional to the pressure exerted by the gas when in equilibrium with the solution. Thus, the critical solubility pressure may be determined for a given gas loading and adhesive material in the following manner. It has been found that the critical solubility pressure ($P_{cs}$) is equal to a coefficient (A) multiplied by $[x/(1-x)]$, where "x" is the gas volume fraction of gas added to the adhesive material, at standard temperature and pressure. (A) can be determined from a plot of $P_{cs}$ against $[x/(1-x)]$, (A) being the slope of the resultant line. $P_{cs}$ is determined for at least two gas volume percentages by injecting a known volume percent of gas at standard temperature and pressure into a known quantity of adhesive material under a pressure such that, after sufficient mixing and time, no gas bubbles are visible. The pressure is then reduced until bubbles appear and further until the point at which the bubbles begin to grow in size. The pressure at which initial enlargement is apparent to the naked eye is taken as the critical solubility pressure $P_{cs}$. The critical solubility pressure for a desired gas loading is then determined by multiplying the coefficient (A) by $[x/(1-x)]$ where "x" is the desired volume fraction of the gas.

Additional pressure above the critical solubility pressure will generally be necessary in order to form and transport the solution within the residence times and mixing regimes typical of commercial foaming equipment. The total pressure is referred to herein as the "solubility pressure." Typically, for nitrogen gas, the solubility pressure is approximately twice the critical solubility pressure. For example, for a gas volume fraction of 85%, 1600 psi is used for a gas/adhesive material solution with a critical solubility pressure of 750 psi.

Upon a sufficient reduction in pressure, the gas evolves from and/or expands in the solution in the form of bubbles in the molten adhesive material to form a structure comprising the elastic adhesive material and cells (a foam is formed). The solution is typically caused to foam by decreasing the pressure to a point below the critical solubility pressure. It is typically desired to avoid the reduction of pressure until tile desired point of discharge. If the critical solubility pressure is reached before this point, there may be a loss of gas resulting in a decreased caliper. It is believed that, if the critical solubility pressure is reached before discharge, the wall shear exerted by a typical fluid transport system causes the bubbles flowing near the walls of the dispensing device to elongate and weaken. As a result, bubbles can burst upon exiting the device such that gas is lost and there is a decrease in caliper and an increase in density (and basis weight). An increased number of open cells relative to closed cells may also result.

A particularly suitable method of incorporating the gas into the adhesive material utilizes the FoamMix® system available from the Nordson Corporation of West Lake, Ohio. This system is described in detail in U.S. Pat. Nos. 4,778, 631, issued to Cobbs, Jr. et al., on Oct. 18, 1988; and 5,056,034, issued to Rucki, et al. on Oct. 8, 1991. With such a system, the adhesive material may be mixed with the gas to provide an adhesive/gas solution under pressure such that when the adhesive/gas solution is subsequently discharged at atmospheric pressure, the gas is released from the solution and becomes entrapped in the adhesive material to form a relatively homogeneous foam. In the FoamMix® system, mixing is accomplished by force feeding the gas and adhesive material into and through a low energy input disc mixer with a low pressure drop across the mixer such that premature foaming of the adhesive material is prevented or minimized. The disc mixer includes a tubular housing, one or more drive shafts extending along the length of the housing, and a series of discs spaced along the shafts. The gas enters into solution with the copolymer mixture in the compartments between the rotating discs. The overall pressure drop of the system is kept sufficiently low relative to the temperature increase of the material to maintain the gas in solution throughout the system and up to the dispensing device, e.g., a valved nozzle, to avoid foaming of the material prior to discharge. A sufficient pressure differential across the dispensing device is provided to maintain the gas in solution prior to discharge, yet to permit foaming after discharge at atmospheric pressure.

Another system suitable for forming and dispensing the foamable composition is the FoamMelt® system available from the Nordson Corp. This system is described in U.S. Pat. No. 4,679,710, issued to Jameson et al. on Jul. 14, 1987, incorporated herein by reference.

The foam is stabilized by cooling the molten adhesive material. Under laboratory conditions, ambient temperatures will generally suffice. Alternatively, the cellular structure may be cooled by external means, e.g., chill rolls. It is generally desired to immediately form a skin on the foam suffices by cooling just the outside surfaces in order to prevent or minimize gas loss. Generally, every chilled suffice will form a skin thereon. However, sufficient time should be allowed for the gas bubbles to grow to substantially their maximum size at standard temperature and pressure (i.e., the gas is at or near its equilibrium pressure at standard temperature and pressure). If the adhesive material sets prior to such growth, there may later be an apparent gas loss resulting from the pressure exerted by the gas entrapped in closed cells. It is believed that this pressure may be sufficient to cause diffusion of the gas out of the foam structure such that the cellular structure and physical properties of the foam change over time. Typically, sufficient time is provided by allowing at least about 0.5 second, preferably about 2 seconds, before cooling and any compression.

In addition, it is usually desired to form and stabilize the foam structure in the substantial absence of compressive forces (e.g., compression or tension). Such forces may limit the growth of the gas bubbles resulting in reduced caliper and a change in other physical properties. For example, tensioning rolls and combining rolls such as are typically used in commercial laminating equipment may cause compressive forces. Therefore, lamination preferably occurs after the foam structure has solidified (e.g., using the pressure-sensitive properties of the adhesive material of the foam and/or external bonding agents as described herein). Lamination may alternatively occur before cooling (i.e., via the hot-melt properties of the adhesive material if the process is carefully engineered to avoid compression during solidification. For example, the clearance of the combining rolls may be set to the loft of the unsolidified foam existing at the time the laminae pass through the combining rolls.

The gas/adhesive material solution is typically applied to a substrate upon which foaming is desired to occur. Suitable substrates include permanent substrates (i.e., the elastomeric adhesive foam will be used as an integral pan of the substrate such that the substrate is a carrier as further described herein) and temporary substrates (e g., release paper, transfer webs and molds). A foam formed on a temporary substrate is later suitably affixed to a carrier. The solution may be applied to the substrate by any suitable method for preparing films, for example, casting and slot coating. The solution can be applied to the substrate to obtain a foam product in a desired shape, and/or in any discontinuous or continuous pattern.

The foam is typically shaped during and/or after its formation. Shaping may be achieved by any conventional shaping technique as are known in the art to form a foam having a defined shape and size. Preferred methods for shaping the foam include casting molding, or forming operations. Casting and molding techniques generally involve introducing the solution into a prepared mold cavity or onto a substrate and reducing the pressure such that the foam expands into the shape of the mold cavity or substrate. Examples of specific molding techniques for use herein include injection molding, rotary molding, and vacuum molding. Forming techniques involve performing various operations on the gas/adhesive material solution or foam to modify its shape and/or size. Examples of specific forming techniques for use herein include coating, extruding, and laminating operations. For example, the solution may be dispensed through an orifice to form a foam having a shape corresponding to the shape of the orifice. In addition, the foam shape can be controlled by using an intermittent nozzle or a row of intermittent nozzles of a variety of shapes (e.g., slot or bead). By turning selected nozzles on and off over the substrate passing below, a multitude of two-dimensional patterns or shapes can be made. Further, the solution may be cast on a surface to form a foam having a desired shape or surface morphology. Any or all of these techniques may also be used in combination to form the shaped foam. Any suitable apparatus as are known in the art may be used to carry out such operations.

The resultant elastomeric adhesive material foam in an uncompressed state can be described as a relatively homogeneous dispersion of a gas in the elastomeric adhesive material. The gas can be dispersed to form closed and/or open cells, as previously defined. The foam may thus be characterized by a cell ratio, i.e, the percent open cells/percent closed cells. The cell ratio and other features can impact on various properties of the foam, including caliper, elongation force, compressibility, and resilience.

The cell ratio may be varied by changing the percent of gas incorporated into the elastomeric adhesive material. The cell ratio may also vary with the viscosity, and thus the temperature, of the gas/adhesive material solution. For a given viscosity and temperature, the cell ratio tends to increase with an increase in gas loading (volume % or fraction). For a given gas loading, the greater the viscosity or the lower the temperature, the greater the tendency for closed cells to form such that the cell ratio decreases. Without wishing to be bound by theory, it is believed that a gas loading of about 50 volume % provides at least about 90% closed cells (cell ratio of 1:9) at the process temperatures typically used, e.g., 325° F. Gas loadings of 75–80 volume % may provide up to about 75% closed cells (cell ratio 4:3), depending on the process temperature used.

The cell ratio may also be influenced by the length of the time period between the point at which the critical solubility pressure is reached and the point of discharge of the solution from, e.g., a dispensing nozzle (i.e., the "transit time"). It is believed that the longer the transit time, the more likely the formation of open cells and consequent gas loss and reduced caliper (it is believed that open cells tend to form as a result of wall shear during transport). For example, one system displayed about 50% gas loss for a transit time of about 10 milliseconds. Thus, the shorter the transit time, the lower the cell ratio tends to be.

The transit time tends to decrease with an increase in the flow rate of the solution in a transport system. Thus, any factor tending to increase the flow rate tends to decrease the transit time and the cell ratio. For example, the transit time may be reduced by decreasing the viscosity, e.g., by increasing the temperature, of the solution. The transit time may also be reduced by decreasing the length of the transport system, e.g., the dispensing device (e.g., nozzle).

For use in absorbent articles, it is generally preferred that the foam have a caliper of from about 25 to about 60 mils, preferably from about 35 to about 45 mils. Foams having such calipers are believed to aid in providing sufficient stiffness to prevent or minimize rolling and/or creasing of structures incorporating the foam. In addition, these calipers provide a desirable aesthetic effect in articles incorporating same.

Features influencing caliper include the gas loading, temperature, line speed, basis weight, tack, and cell ratio. With the other features constant, caliper tends to increase with increasing gas loadings and to decrease with increasing line speed. In addition, as the adhesive tack increases, the foam caliper may tend to decrease after compression of the foam. This effect is more likely as the cell ratio increases. Thus, suitable foams may require using lower process temperatures and/or reduced transit times in order to ensure a percentage or closed cells sufficient to retain an initial caliper (and compressibility) after the foam is subjected to compressive forces, e.g., during processing or in use. Caliper is also affected by the ability of the foam to grow. In general, if the foam has not been allowed to grow prior to solidification, less than theoretical caliper (based on gas loading and line speed) will result. As previously described, foam growth tends to be maximized by ensuring adequate time for the gas to expand and by minimizing compressive forces prior to solidification.

The foams of the present invention may also be characterized by a force of elongation at 50% extension as defined herein in reference to elasticized side panels of absorbent articles. The force of elongation is primarily determined by the elastomeric adhesive material making up the foam. The force of elongation is also influenced by the foam density. For a given cell ratio and cell size, the force of elongation tends to increase with an increase in foam density (i.e., with a decrease in gas fraction). The force of elongation of the foam may also be influenced by the cell ratio. The elongation force lends to increase as the cell ratio decreases. Thus, the elongation force may be increased by any of the methods of decreasing the cell ratio, e.g., decreasing temperature or gas loading.

The foams of the present invention are also compressible. By compressible, it is meant that the foam can be pressed down by a fairly low force, e.g., 1 psi. The foams are also resilient, i.e., they relax back substantially to their pre-compressed state upon removal of the compressive force. Compressibility and resilience are primarily a result of the foam cellular structure and the elastomeric properties of the elastomeric adhesive material. Thus, any factor which influences the cell structure and elastomeric properties may impact on compressibility and resilience. In general, compressibility tends to increase as the cell ratio increases (increasing open cells) while resilience tends to increase as the cell ratio decreases (increasing closed cells). For a given cell ratio, both compressibility and resilience tend to decrease with increasing adhesive tack.

The percent compression and resilience of the adhesive foams can be determined by standard methods. A piece of the foam with a predetermined caliper is compressed by a force of 1 psi in the direction of the measured caliper for a period of 1 minute. The force is then removed and the foam is allowed to relax for 2 minutes. The caliper under compression at 1 minute and the caliper after relaxation are determined. The percent compression is calculated as: [(initial caliper–caliper under compression)/(initial caliper),× 100]. The percent resilience is calculated as: [(caliper after relaxation)/(initial caliper),×100]. The foams of the present invention preferably have a percent compression of at least about 5%, more preferably at least about 20%. The foams preferably have a percent resilience of at least about 90%, more preferably about 100% .

The foams of the present invention are useful when joined to a carrier, and are particularly useful for imparting elastomeric properties to the carrier. The carder may be any carrier as are known in the art such as non-woven webs, apertured polymeric webs, and polymer films. Suitable carriers include any of the top sheet, back sheet, or absorbent core materials described herein for use in absorbent articles. The carrier may be of any desired shape and may be shaped before, during or after joinder with the foam.

The foam is preferably joined to the carrier via the adhesive properties of the elastomeric adhesive material making up the foam. For relatively low tack foams, external bonding agents such as those adhesives described herein in reference to joinder of the backsheet may be desired. The foam may be joined to the carrier in a continuous process, i.e. on-line, or after forming the foam in an intermediate step, i.e., off-line The foam may be joined to one or more carriers, e.g., to form a bilaminate or a trilaminate in which the foam is the central lamina and two carriers are the outboard laminae.

In a continuous process, the foam may be joined to at least one carrier via the hot-melt and/or pressure-sensitive properties of the adhesive foam. External bonding agents may also be used to effect or enhance joinder. In a preferred embodiment, joinder occurs via the hot-melt and/or pressure-sensitive properties of the elastomeric adhesive material of which the foam is comprised.

Joinder via the hot-melt property of the adhesive material to at least one carrier occurs where the foam is formed directly on a permanent substrate, e.g., a backsheet material for use in absorbent articles. For formation of a laminate via the hot-melt property of the adhesive material, it is desirable to provide sufficient contact of the carrier(s) with the hot-melt in order to ensure bonding, without subjecting the laminate to compressive forces which undesirably limit foam growth. The temperature of the hot-melt may need to be regulated in order to avoid or minimize deformation or melting of the carrier(s). A trilaminate can also be formed by solidifying the foam on a first carrier (the resultant bilaminate is via the hot-melt property) followed by joinder of a second carrier via the pressure-sensitive properties of the adhesive material and/or an external bonding agent where the adhesive foam has relatively low adhesion to the second carrier. In a preferred embodiment, the foam has sufficient tack so as to allow joinder to the second carrier via the pressure-sensitive property of the foam.

In another continuous process, the foam is formed and solidified on a temporary substrate such as a forming roll or forming belt (e g., a transfer belt) and then affixed to one or more carriers via the pressure-sensitive property of the foam and/or an external bonding agent. Preferably, a foam having sufficient pressure-sensitivity to allow joinder without additional bonding agents is used. The forming roll may be smooth to provide a continuous sheet of the foam, or patterned (e.g., a rotary mold such as a "pocket" or "pattern" roll, and preferably using at least one intermittent dispensing device) to provide foam shapes as may be desired. The forming roll will preferably be selectively chillable, e.g., the roll will be capable of rotating the solution and/or foam from between non-chilled and chilled zones. In a preferred embodiment, the gas/adhesive material solution is dispensed onto a non-chilled zone, allowed to foam, and then rotated to solidify the foam structure. Foam shapes may alternatively be formed by using at least one intermittent dispensing device and a smooth forming roll or forming belt. The shaped foam may then be affixed to a carrier, for example, directly off of the roll or after intermediate transfer to a transfer web.

In an off-line process, the foam is directly formed on a temporary substrate such as release paper. After solidification of the foam structure, the foam can be joined to one or more carriers via the pressure-sensitive adhesive properties of the foam and/or an external bonding agent.

Where the foam is solidified prior to joinder to one or more carriers, it may be applied to a first carrier in a pre-stretched (i.e., contractible) condition or in a non-stretched condition. If applied in a stretched condition, the stretch of the resultant bilaminate will generally be maintained through the step of joinder to a second carrier where a trilaminate is desired.

As shown in FIG. 1, the elastomeric adhesive foam can be joined to two carriers to form a unitary, elastically extensible laminate 30 having at least three laminae. The central lamina 30b comprises the adhesive foam of the present invention, and is joined in face-to-face relation with at least two outboard laminae 30a and 30c. The outboard laminae may be any of the materials described herein in reference to the carrier, and typically comprise a relatively inextensible material.

Figure 2:
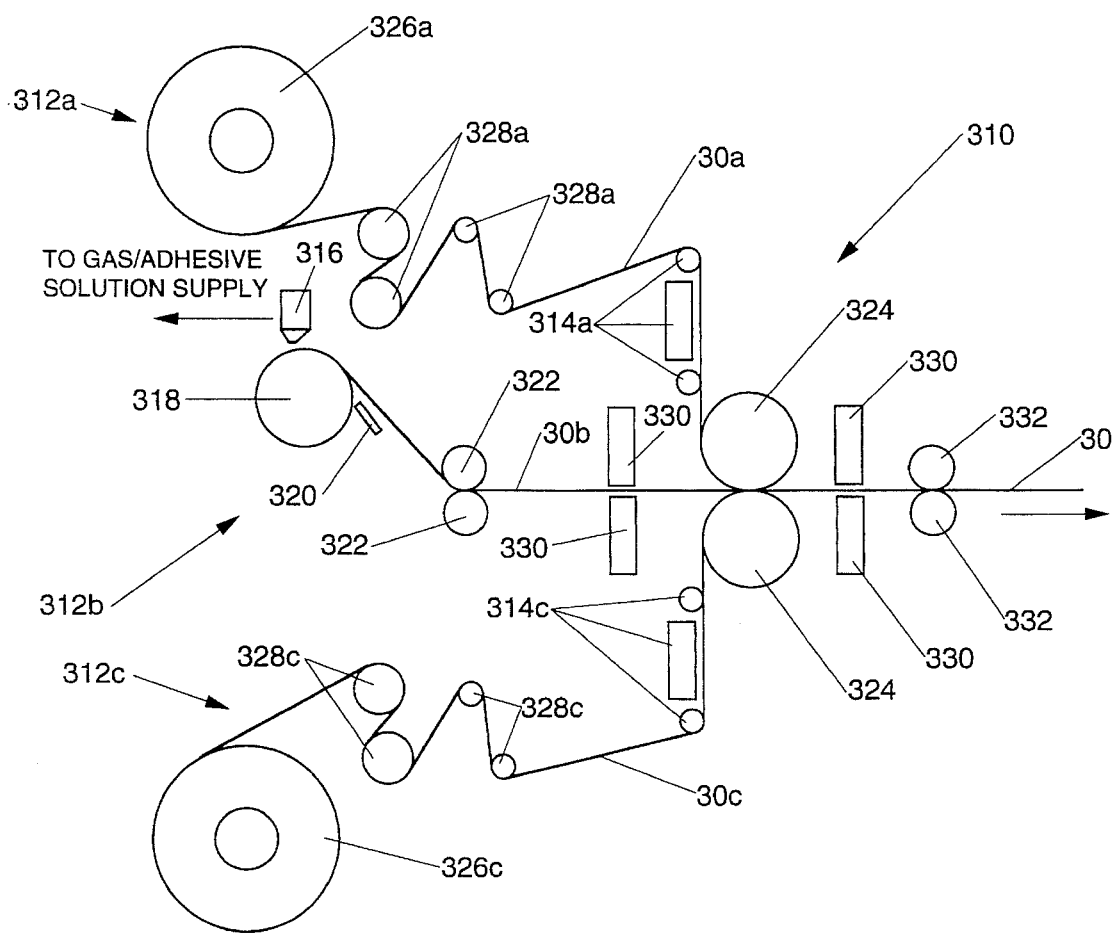
FIG. 2 is a side elevational schematic view of one apparatus which may be used to manufacture the laminate shown in FIG. 1.

Referring to FIG. 2, the laminate 30 of the present invention may be produced on the illustrated apparatus 310. The apparatus 310 comprises three separate lines: line 312b for the central lamina 30b and complimentary lines 312a and 312c for the outboard laminae 30a and 30c. The first line 312b, utilized for the central lamina 30b, comprises a source of the foamable gas/adhesive material solution (not shown), a dispensing device 316 and a chill roll 318 to form the web of the central lamina 30b. The outboard laminae 30a and 30c are formed on lines 312a and 312c. The materials used for the outboard laminae 30a and 30c are taken from unwind rolls 326a and 326c through S-wrap tensioning rolls 328a and 328c and, if desired, through tracking systems 314a and 314c. The combining rolls 324 join the confluent laminae 30a, 30b, and 30c into a unitary laminate 30.

Examining FIG. 2 in more detail, the apparatus 310 comprises the means for joining at least three laminae in face-to-face relation. The central lamina 30b is formed from a supply of foamable gas/adhesive material solution (not shown). The source of the foamable solution is suitably the mixer of the FoamMix® system shown in the above referenced patents to Cobbs, Jr., et al. and Rucki, et al. The foamable gas/adhesive material solution is generally held at a temperature of about 325° F.–375° F. and a pressure of about 500–2,000 psig.

The mixer supplies the foamable solution, under pressure, to the dispensing device 316. The dispensing device 316 may be, for example, the nozzle shown in FIG. 1 of the above referenced U.S. Pat. No. 4,778,631 issued to Cobbs, Jr., or the gun 26 as shown in FIG. 1 of the above referenced U.S. Pat. No. 5,056,034 issued to Rucki, et al. The dispensing device 316 has a slot through which the foamable solution for forming the central lamina 30b is dispensed to form a thin film of foam (typically about 5–15 mils in thickness unfoamed, 20–60 mils in thickness foamed) and of any desired width, onto the chill roll 318. A central lamina 30b of about 0.05–0.2 grams per square centimeter is suitable. It will be apparent to one skilled in the art that increasing the thickness of the lamina 30b will provide a proportional increase in the ultimate elastic strength of the lamina 30b and thus the laminate 30.

Upon discharge of the solution to atmospheric pressure, the foam forms as previously described. The chill roll 318 preferably cools the lamina 30b to prevent damage to the carrier but without hindering foam growth. The web of the central lamina 30b is separated from the chill roll by a doctor blade 320. A second roll (not shown) may be utilized in conjunction with the chill roll 318 to provide additional cooling to solidify the laminate and a nip for compression of the web of the central lamina 30b.

The central lamina 30b is then drawn through a nip formed between tensioning rolls 322. The tensioning rolls 322 provide for proper takeoff speed of the central lamina 30b from the chill roll 318 and further provide for proper entry of the central lamina 30b into the combining rolls 324. For pressure-sensitive foams, it may be desirable to use tensioning rolls having release properties such as are known in the art in order to prevent or minimize sticking of the foam to the rolls.

The outboard laminae 30a and 30c are taken from the unwind rolls 326a and 326c and preferably pass through S-wrap tensioning rolls 328a and 328c to provide for proper tensioning to prevent puckering or bunching of the outboard laminae 30a and 30c. If necessary, tracking systems 314a and 314c, as is commonly utilized and known in the art, may be employed to optimally track and adjust the web of outboard laminae 30a and 30c into the combining rolls 324. A tracking system manufactured by the Fife Corporation of Oklahoma City, Okla., and sold as a Fife Guide Model No. OP6 LRA is suitable.

The laminae 30a and 30c enter the combining rolls 324 generally parallel to the travel of the laminate 30 as it passes through the nip of the combining rolls 324. The nip of the combining rolls 324 compresses the laminae 30a and 30c into contacting relationship with the opposed faces of the central lamina 30b causing the central lamina 30b to bond to the outboard laminae 30a and 30c —joining the three laminae 30a, 30b, and 30c.

If desired, the laminate 30 need not incorporate two outboard laminae 30a and 30c. If desired, either or both outboard laminae 30a and 30c may be omitted from the laminate 30. Such a structure may be manufactured by selectively not operating the line 312a or 312c of the outboard lamina 30a or 30c desired to be omitted. The resulting laminate 30 has one lamina 30b or, for example, two laminae 30a and 30b with the lamina 30b being of elastomeric adhesive foam and the lamina 30a being of relatively inextensible substrate material. After a two laminae laminate 30 leaves the nip of the combining rolls 324, the exposed face of the lamina 30b may be deactivated, by an anti-blocking agent as is commonly known in the art, so that the adhesive of the lamina 30b does not bond to other materials through the pressure-sensitive properties of the adhesive making up the foam of the lamina 30b. Anti-blocking is accomplished by the adhesive deactivation system 330 applying a powder of resin to the exposed face of the lamina 30b. Suitable resin powders include talcum powder, polyolefinic powders, and preferably a resin similar to that used for the second lamina 30a. If desired, the adhesive deactivation system 330 may be applied to the exposed face of the lamina 30b prior to the lamina 30a entering the nip of the combining rolls 324. (It will be apparent to one skilled in the an that an adhesive deactivation system 330 should not be employed prior to the combining rolls 324 if a laminate 30 having two outboard laminate 30a and 30c is to be constructed using to the apparatus 310 of FIG. 1.)

The apparatus 310 can also have a secondary heating element, such as heated rollers 332, to selectively provide localized heating to the zones of laminate 30 in order to render the zones inelastic.

If desired, one or both of outboard laminae 30a and 30c may be elastically extensible. The outboard laminae 30a and 30c may be or similar or different materials, as desired. Alternatively, a film or nonuniform thickness may be utilized for the outboard laminae 30a and 30c. As the thickness of the film increases, a greater force will be required for the same amount of extension to occur. The laminate 30 may be heat sealed as desired.

The resultant laminate 30 can be described as a "zero strain" laminate, i.e., the elastomeric adhesive foam is joined to the carrier in a substantially untensioned condition (i.e., "zero strain").

In a preferred embodiment, at least a portion of the "zero strain" laminate 30 containing the elastomeric foam is then subjected to mechanical stretching sufficient to permanently elongate the relatively inextensible components of the laminate 30. The composite or elastomeric laminate is then returned to its substantially untensioned condition so as to form a "zero strain" stretch laminate. As used herein, the term "zero strain" stretch laminate refers to a laminate comprised of at least two plies of material which are secured to one another along at least a portion of their coextensive surfaces while in a substantially untensioned ("zero strain") condition; one of the plies comprising a material which is stretchable and elastomeric (i.e., it will return substantially to its untensioned dimensions after an applied tensile force has been released) and a second ply which is elongate (but not necessarily elastomeric) so that upon stretching the second ply will be, at least to a degree, permanently elongated so that upon release of the applied tensile forces, it will not fully return to its original undeformed configuration. "Zero strain" stretch laminates are disclosed in U.S. Pat. No. 2,075,189 issued to Galligan, et al. on Mar. 30, 1937: U.S. Pat. No. 3,025,199 issued to Harwood on Mar. 13, 1962; U.S. Pat. No. 4,107,364 issued to Sisson on Aug. 15, 1978; U.S. Pat. No. 4,290,563 issued to Sisson on Jun. 24, 1980; and U.S. Pat. No. 4.834,741 issued to Sabee on May 30, 1989. Each of these patents are incorporated herein by reference.

Particularly preferred methods and apparatus used for making "zero strain" stretch laminates out of a topsheet, a backsheet, and an elastomeric member positioned between the same, use meshing corrugated rolls to mechanically stretch the components. A discussion of suitable apparatus and methods for mechanically stretching portions of a diaper is contained in the hereinbefore referenced U.S. Pat. No. 4,107,364 issued to Sisson on Aug. 15, 1978 and U.S. Pat. No. 4,834,741 issued to Sabee on May 30, 1989. Particularly preferred apparatus and methods are disclosed in U.S. Pat. No. 5,167,897 entitled "Improved Method and Apparatus for Incrementally Stretching a Zero Strain Stretch Laminate Web to Impart Elasticity Thereto"; issued to Gerald M. Weber, et al. on Dec. 1, 1992; U.S. Pat. No. 5,156,793 entitled "Improved Method and Apparatus for Incrementally Stretching Zero Strain Stretch Laminate Web in a Non-Uniform Manner to Impart a Varying Degree of Elasticity Thereto"; issued to Kenneth B. Buell, et al. on Oct. 20, 1992; and U.S. Pat. No. 5,143,679 entitled "Improved Method and Apparatus for Sequentially Stretching Zero Strain Stretch Laminate Web to Impart Elasticity Thereto Without Rupturing the Web"; issued to Gerald M. Weber, et al. on Sep. 1, 1992. The specifications and drawings of each one of the foregoing applications are incorporated herein by reference. Details of a particularly preferred incremental stretching system which can be employed in making "zero strain" stretch laminates are described in U.S. Pat. No. 5,151,092, issued to Buell, et al., on Sept. 29, 1992, incorporated herein by reference.

In another embodiment, the lamina 30b may be operatively associated with the laminae 30a and/or 30c in a tensioned condition (prestretched). After prestretching the lamina 30b, the lamina 30b is joined with the second lamina 30a and/or 30c. Upon release of the force causing prestretching of the lamina 30b, the resulting laminate 30 gathers or contracts in the direction of prestretching. Where a relatively inextensible outboard lamina 30a and/or 30c is used, the resulting laminate 30 will be elastically extensible to the extensibility limit of the laminae 30a or 30c. If the laminate 30 is elongated beyond the amount of prestretch of the lamina 30b, the free length of the relatively inextensible outboard lamina 30a and 30c will be exceeded. If this should occur, the stress/strain experienced by the laminae 30a and 30c will sharply increase without significant elongation and rupture of the laminae will likely occur. Therefore, the lamina 30b should be prestretched to at least the desired amount of elongation to obviate high stresses and strains on the outboard laminae and rupture of the laminate. After rupture, the elastic properties of the outboard laminae 30a and/or 30c would control further elongation.

The central lamina 30b can be prestretched in one or more directions. If the central lamina 30b is prestretched in two principal directions (longitudinal and lateral, i.e., machine direction and cross-machine direction, respectively), the resulting laminate 30 will contract in both such directions, proportional to the magnitude of prestretching in each principal direction. As used herein, the term "machine direction" refers to the direction generally parallel to the travel of the laminate 30 as it passes through the nip of the combining rolls 324, while "cross direction" refers to the direction generally perpendicular to the travel of the laminate 30 as it passes through the nip of the combining rolls 324.

The central lamina 30b may be prestretched by any means known in the art. For example, the surface speed of the combining rolls 324 may be greater than the surface speed of the tensioning rolls 322. This causes prestretching of the central lamina 30b in the machine direction, which prestretching is proportional to the differential surface velocity between the combining rolls 324 and the tensioning rolls 322, and the distance therebetween. Prestretching in the cross direction can occur by methods such as are known in the art, e.g., by tentering the lamina using, e.g., a Mt. Hope roll, grooved roll, or an expanding conveyor and a cam.

In yet another embodiment, the elastomeric adhesive foam may alternatively be operatively associated with the outboard lamina 30a and 30c in a tensioned condition (prestretched), followed by mechanical stretching of the laminate 30 to form a mechanically stretched, pretensioned, stretch laminate.

In still another embodiment of the present invention, at least a portion of the relatively inextensible laminae 30a and/or 30c is subjected to mechanical stretching prior to lamination with the central lamina 30b in order to provide both a "zero strain" stretch laminate and to prestrain the portion of the inextensible lamina. The outboard laminae may be prestretched in the same manner described in reference to the central lamina 30b.

The lamina 30b may be in the form or a continuous sheet. In a preferred embodiment, the lamina 30b is formed as a continuous sheet on a backsheet material as described herein. Lamina 30a then preferably comprises a topsheet material as described herein. Alternatively, the lamina 30b may be shaped as previously described, for example, by molding such as in a rotary mold. The shaped lamina 30b is then affixed to a backsheet material (lamina 30b) so as to elasticize particular portions of a disposable absorbent article after joinder with other components of the article.

In an alternative embodiment, the elastomeric adhesive foam is formed by an intermediate process as described herein for subsequent association with a permanent carrier. The foam can be formed on release paper, e.g., using apparatus as shown and described for apparatus 310, wherein at least one of the material unwind rolls is release paper. (The foam may also be formed on a transfer web such as known in the art). The foam may then be wound upon itself for later joinder to a carrier. The foam can be joined to the permanent carrier in a non-tensioned condition to form a "zero strain" laminate as previously described. Alternatively, the elastomeric adhesive foam may be associated with the carrier in an elastically contractible (prestretched) condition so that the elastomeric adhesive foam gathers or contracts the carrier upon release of the force used to prestretch the foam. A more detailed description of the manner in which an elastomeric material may be secured in an absorbent article in an elastically contractible condition can be found in U.S. Pat. No. 3,860,033, issued to Buell on Jan. 14, 1975, and in U.S. Pat. No. 4,081,301, issued to Buell on Mar. 28, 1978; both patents being incorporated herein by reference. For example, the elastomeric adhesive foam can be contractibly affixed to the carrier by laterally extending, the elastomeric adhesive foam member, affixing the elastomeric adhesive foam to the carrier, and allowing the adhesive foam to assume its relaxed or uncontracted orientation. (The previously described shaped lamina 30b may also be contractibly affixed to a carrier in such manner in a continuous process). The resultant "zero strain" laminate or pre-stretched laminate may be mechanically stretched as previously described to form a "zero strain" stretch laminate or a pre-tensioned stretch laminate, respectively.

The elastomeric adhesive foams and laminates are particularly useful to impart compressibility, resilience, and/or elasticity to absorbent articles. Entire panels of such articles or portions thereof may thus be made compressible, resilient, and/or elastic. As used herein, the term "absorbent article" refers to devices which absorb and contain body exudates, and, more specifically, refers to devices which are placed against or in proximity to the body of the wearer to absorb and contain the various exudates discharged from the body. The term "disposable" is used herein to describe absorbent articles which are not intended to be laundered or otherwise restored or reused as an absorbent article (i.e., they are intended to be discarded after a single use and, preferably, to be recycled, composted or otherwise disposed of in an environmentally compatible manner). A "unitary" absorbent article refers to absorbent articles which are formed of separate parts united together to form a coordinated entity so that they do not require separate manipulative parts like a separate holder and liner. A preferred embodiment of an absorbent article of the present invention is the unitary disposable absorbent article, diaper 20, shown in FIG. 3. As used herein, the term "diaper" refers to an absorbent article generally worn by infants and incontinent persons that is worn about the lower torso of the wearer. It should be understood, however, that the present invention is also applicable to other absorbent articles such as incontinent briefs, incontinent undergarments, diaper holders and liners, training pants, feminine hygiene garments, and the like.

Figure 3:
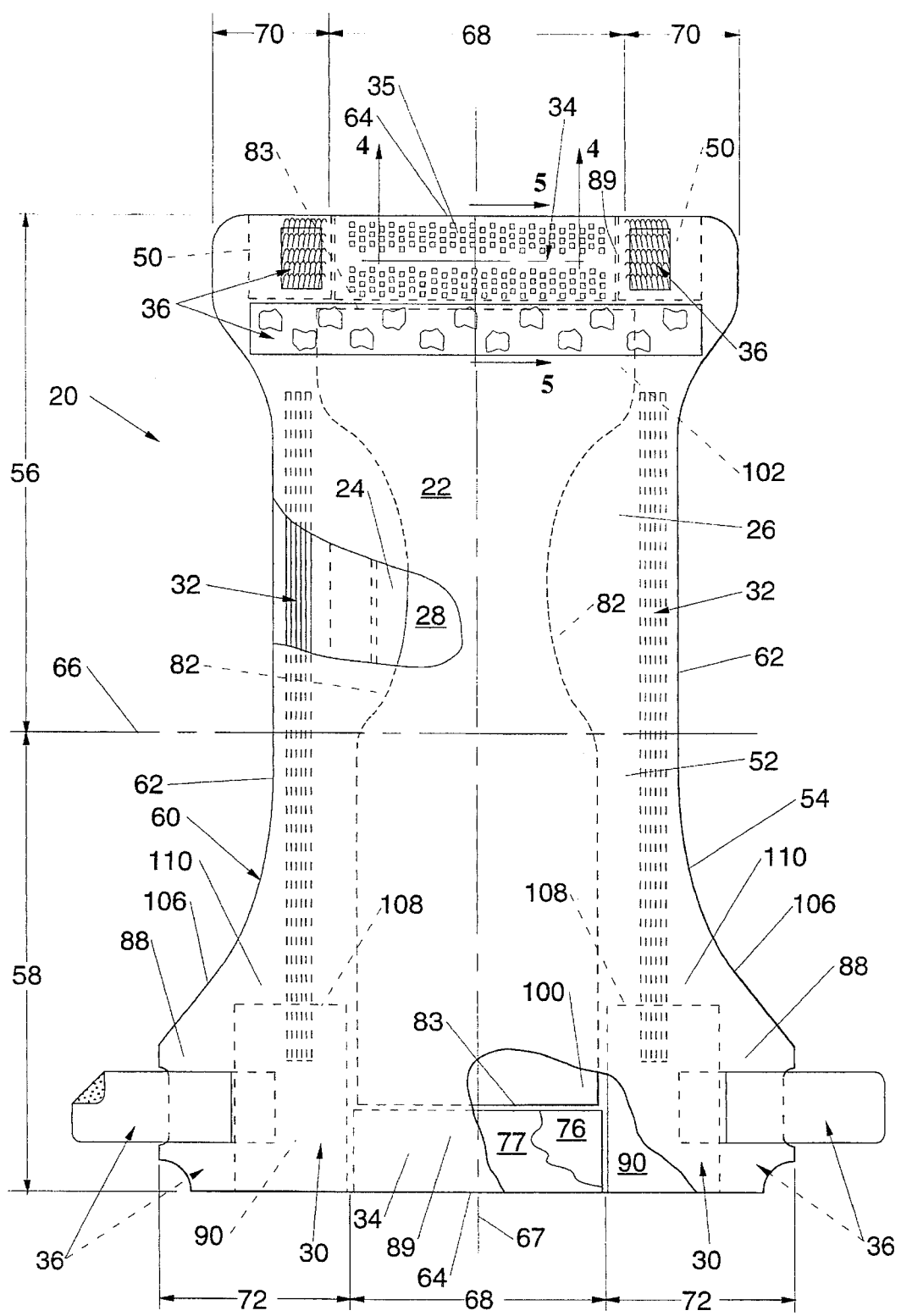
FIG. 3 is a plan view of a disposable diaper embodiment of the present invention having portions cut away to reveal underlying structure, the outer surface of the diaper facing the viewer.

FIG. 3 is a plan view of the diaper 20 of the present invention in its flat-out, uncontracted state (i.e., with elastic induced contraction pulled out except in the side panels wherein the elastic is left in its relaxed condition) with portions of the structure being cut-away to more clearly show the construction of the diaper 20 and with the portion of the diaper 20 which faces away from the wearer, the outer surface 52, facing the viewer. As shown in FIG. 3, the diaper 20 comprises a containment assembly 22 preferably comprising a liquid pervious topsheet 24, a liquid impervious backsheet 26 joined with the topsheet 24, and an absorbent core 28 positioned between the topsheet 24 and the backsheet 26, elasticized side panels 30; elasticized leg cuffs 32; an elastic waist feature 34; and a closure system comprising a dual tension fastening system generally multiply designated as 36.

The diaper 20 is shown in FIG. 3 to have an outer surface 52 (facing the viewer in FIG. 3), an inner surface 54 opposed to the outer surface 52, a first waist region 56, a second waist region 58 opposed to the first waist region 56, and a periphery 60 which is defined by the outer edges of the diaper 20 in which the longitudinal edges are designated 62 and the end edges are designated 64. (While the skilled artisan will recognize that a diaper is usually described in terms of having a pair of waist regions and a crotch region between the waist regions; in this application, for simplicity of terminology, the diaper 20 is described as having only waist regions, each of the waist regions including a portion of the diaper which would typically be designated as part of the crotch region). The inner surface 54 of the diaper 20 comprises that portion of the diaper 20 which is positioned adjacent to the wearer's body during use (i.e., the inner surface 54 generally is formed by at least a portion of the topsheet 24 and other components joined to the topsheet 24). The outer surface 52 comprises that portion of the diaper 20 which is positioned away from the wearer's body (i.e., the outer surface 52 generally is formed by at least a portion of the backsheet 26 and other components joined to the backsheet 26). (As used herein, "body surface" refers to the surface facing the wearer's body; "garment surface" refers to the surface facing away from the wearer's body). The first waist region 56 and the second waist region 58 extend, respectively, from the end edges 64 of the periphery 60 to the lateral centerline 66 of the diaper 20. The waist regions each comprise a central region 68 and a pair of side panels which typically comprise the outer lateral portions of the waist regions. The side panels positioned in the first waist region 56 are designated 70 while the side panels in the second waist region 58 are designated 72. (In the discussion that follows, unless otherwise noted, the diaper 20 will comprise a pair of side panels in each waist region. While it is not necessary that the pairs of side panels or each side panel be identical, they are preferably mirror images one of the other.) In a preferred embodiment of the present invention, the side panels 72 positioned in the second waist region 58 are elastically extensible in the lateral direction (i.e., elasticized side panels 30). (The lateral direction (xdirection or width) is defined as the direction parallel to the lateral centerline 66 of the diaper 20; the longitudinal direction (y direction or length) being defined as the direction parallel to the longitudinal centerline 67, and the axial direction (Z direction or thickness) being defined as the direction extending through the thickness of the diaper 20.)

FIG. 3 shows a preferred embodiment of the diaper 20 in which the topsheet 24 and the backsheet 26 have length and width dimensions generally larger than those of the absorbent core 28. The topsheet 24 and the backsheet 26 extend beyond the edges of the absorbent core 28 to thereby form the periphery 60 of the diaper 20. While the topsheet 24, the backsheet 26, and the absorbent core 28 may be assembled in a variety of well known configurations, preferred diaper configurations are described generally in U.S. Pat. No. 3,860,003 entitled "Contractible Side Portions for Disposable Diaper" which issued to Kenneth B. Buell on Jan. 14, 1975: and U.S. Pat. No. 5,151,092 entitled "Absorbent Article With Dynamic Elastic Waist Feature Having A Predisposed Resilient Flexural Hinge" which issued to Kenneth B. Buell et al. on Sep. 29, 1992; each of which is incorporated herein by reference. Alternatively preferred configurations for disposable diapers herein are also disclosed in U.S. Pat. No. 4,808,178 issued to Aziz et al. on Feb. 28, 1989; U.S. Pat. No. 4,695,278 issued to Lawson on Sep. 27, 1987; and U.S. Pat. No. 4,816,025 issued to Foreman on Mar. 28, 1989. These patents are incorporated herein by reference.

Figure 4:
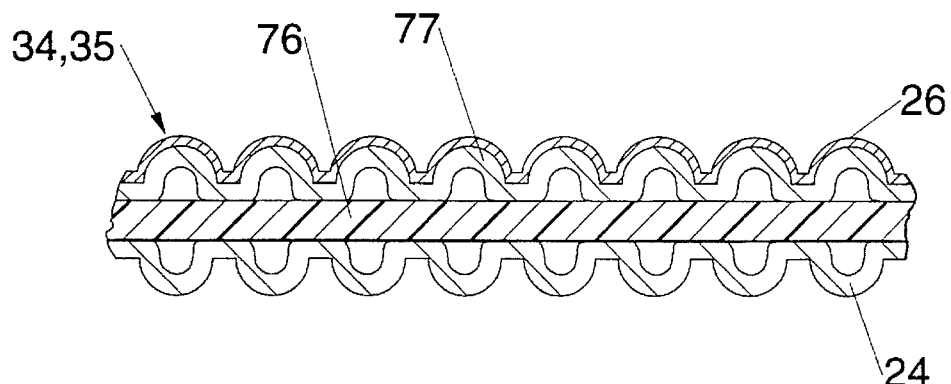
FIG. 4 is a fragmentary sectional view of the disposable diaper shown in FIG. 3 taken along section line 4—4 of FIG. 3.

FIG. 4 is a cross-sectional view of the diaper 20 taken along section line 4—4 of FIG. 3 in the first waist region 56. FIG. 4 shows a construction of the elasticized waistband 35 of the elastic waist feature 34. The elasticized waistband 35 is shown in FIG. 4 in its contracted or relaxed condition. The elasticized waistband 35 preferably comprises a portion of the topsheet 24, a portion of the backsheet 26 that has preferably been mechanically stretched, and an elastomeric member 76 positioned between the topsheet 24 and the backsheet 26. The elastomeric member 76 preferably comprises the elastomeric adhesive foam of the present invention. Although not necessary for practicing the present invention, the elasticized waistband can also comprise a resilient member 77, preferably positioned between the backsheet 26 and the elastomeric member 76 as shown in FIG. 4. The resilient member is suitably as described in U.S. Pat. No. 5, 151,092 issued to Buell et al. on Sep. 29, 1992, incorporated herein by reference. Thus, although the adhesive foam of the present invention is itself resilient, the elasticized waistband can contain additional resilient members such as described in U.S. Pat. No. 5,151,092.

Figure 5:
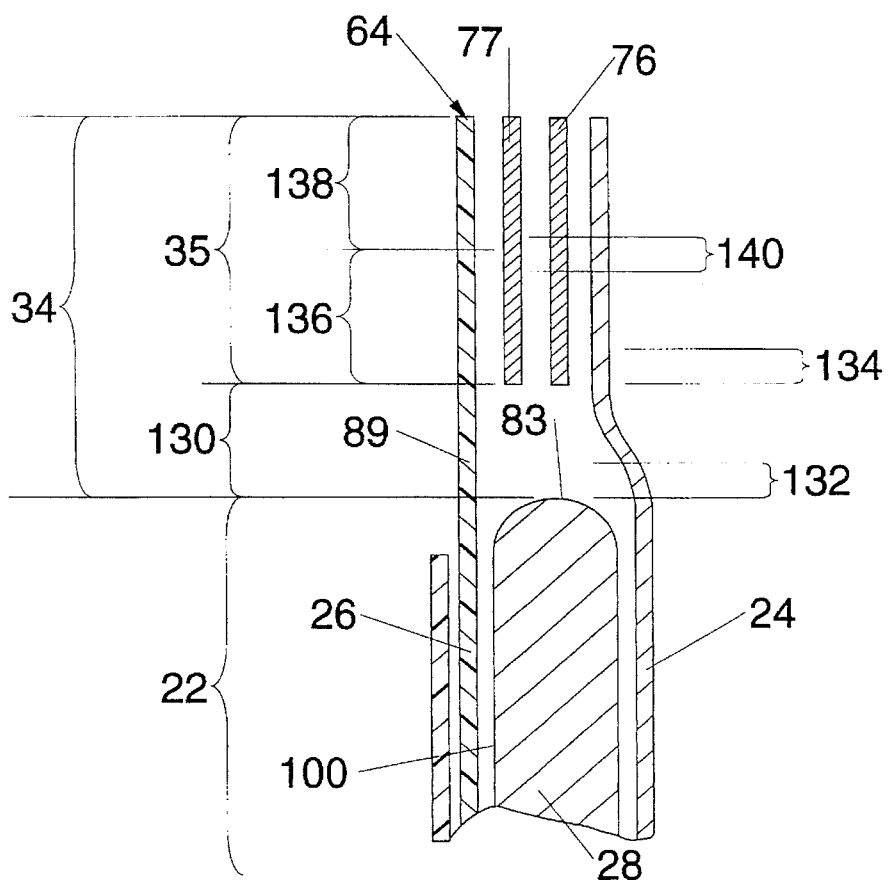
FIG. 5 is a fragmentary sectional view of the disposable diaper shown in FIG. 3 taken along section line 5—5 of FIG. 3.

FIG. 5 is a fragmentary cross-sectional view of the diaper 20 taken along line 5—5 of FIG. 3 and depicts an elastic waist feature construction in the first waist region 56. The absorbent core 28 is generally shown in FIG. 5 and shows the waist edge 83 and the garment surface 100 of the absorbent core 28. The topsheet 24 and the backsheet 26 encase the absorbent core 28 and extend longitudinally outwardly beyond the waist edge 83 of the absorbent core 28 to form a waist flap 89 (also shown in FIG. 3) and the end edge 64. The elastic waist feature 34 extends longitudinally outwardly from the waist edge 83 of the absorbent core 28 in at least the central region 68 and forms at least a portion of the end edge 64. The elastic waist feature 34 comprises an interconnecting panel zone 130, a first flexural hinge zone 132 joining the interconnecting panel zone 130 with the containment assembly 22 adjacent the waist edge 83 of the absorbent core 28, an elasticized waistband 35, and a second flexural hinge zone 134 joining the elasticized waistband 35 with the interconnecting panel zone 130. As shown in FIG. 5, the elasticized waistband 35 comprises a shaping panel zone 136, a waistline panel zone 138, and a predisposed, resilient, waistband flexural hinge zone 140 joining the shaping panel zone 136 and the waistline panel zone 138. The interconnecting panel zone 130 comprises a portion of the topsheet 24 and the backsheet 26 while the elasticized waistband 35 comprises a portion of the topsheet 24 and the backsheet 26 and the elastomeric member 76. As shown in FIG. 5, the elasticized waistband can comprise a resilient member 77 as previously described herein.

The containment assembly 22 of the diaper 20 is shown in FIG. 3 as comprising the main body (chassis) of the diaper 20. The containment assembly 22 comprises at least an absorbent core 28 and preferably an outer covering layer comprising the topsheet 24 and the backsheet 26. When the absorbent article comprises a separate holder and a liner, the containment assembly 22 generally comprises the holder and the liner (i e, the containment assembly 22 comprises one or more layers of material to define tile holder while the liner comprises an absorbent composite such as a topsheet, a backsheet, and an absorbent core) For unitary absorbent articles, the containment assembly 22 comprises the main structure of the diaper with other features added to form the composite diaper structure. Thus, the containment assembly 22 for the diaper 20 generally comprises the topsheet 24, the backsheet 26, and the absorbent core 28.

The absorbent core 28 may be any absorbent means which is generally compressible, conformable, non-irritating to the wearer's skin, and capable of absorbing and retaining liquids such as urine and other certain body exudates. As shown in FIG. 3, the absorbent core 28 has a garment surface 100, a body surface 102, side edges 82, and waist edges 83. The absorbent core 28 may be manufactured in a wide variety of sizes and shapes (e g., rectangular, hourglass. "T"-shaped, asymmetric, etc.) and from a wide variety of liquid-absorbent materials commonly used in disposable diapers and other absorbent articles such as comminuted wood pulp which is generally referred to as airfelt. Examples of other suitable absorbent materials include creped cellulose wadding; meltblown polymers including conform, chemically stiffened, modified or cross-linked cellulosic fibers; tissue including tissue wraps and tissue laminates; absorbent foams; absorbent sponges; superabsorbent polymers, absorbent gelling materials; or any equivalent material or combinations of materials. The configuration and construction of the absorbent core may also be varied (e g. the absorbent core may have varying caliper zones, a hydrophilic gradient, a superabsorbent gradient, or lower average density and lower average basis weight acquisition zones; or may comprise one or more layers or structures). The total absorbent capacity of the absorbent core 28 should, however, be compatible with the design loading and the intended use of the diaper 20. Further, the size and absorbent capacity of the absorbent core 28 may be varied to accommodate wearers ranging from infants through adults. Exemplary absorbent structures for use as the absorbent core 28 are described in U.S. Pat. No. 4,610,678 entitled "High-Density Absorbent Structures" issued to Weisman et al. on Sep. 9, 1986; U.S. Pat. No. 4,673,402 entitled "Absorbent Articles With Dual-Layered Cores" issued to Weisman et al. on Jun. 16, 1987; U.S. Pat. No. 4,888,231 entitled "Absorbent Core Having A Dusting Layer" issued to Angstadt on Dec. 19, 1989; and U.S. Pat. No. 4,834,735, entitled "High Density Absorbent Members Having Lower Density and Lower Basis Weight Acquisition Zones", issued to Alemany el al. on May 30, 1989. Each of these patents are incorporated herein by reference.

The absorbent core 28 may contain the elastomeric adhesive foam of the present invention. For example, the foam may be incorporated in laminate form, the laminate comprising at least one lamina consisting of any of the forementioned liquid-absorbent materials joined to at least one lamina of the elastomeric adhesive foam of the present invention. Such laminates may be made by any of the methods as described herein. Typically a "zero strain" laminate will be used in the absorbent core area.

The backsheet 26 is positioned adjacent the garment surface 100 of the absorbent core 28. In a preferred embodiment, the backsheet 26 is joined to the absorbent core by the elastomeric adhesive foam. (As used herein, the term "joined" encompasses configurations whereby an element is directly secured to the other element by affixing the element directly to the other element, and configurations whereby the element is indirectly secured to the other element by affixing the element to intermediate member(s) which in turn are affixed to the other element.) For example, a trilaminate may be formed as previously described in which one material unwind roll supplies a backsheet material and the other material unwind roll supplies a topsheet material. The absorbent core material is provided by means such as are known in the art, e.g., by using a vacuum forming pocket roll and a transfer web, and is affixed to the foam lamina so as to leave some portion of the foam lamina exposed, preferably the portion around the periphery of the core. The topsheet material is then affixed to the exposed foam lamina to effect joinder with the backsheet. The absorbent core material may alternatively be joined to the topsheet 24 prior to lamination with the backsheet 26.

In a preferred embodiment the elastomeric adhesive foam covers substantially all of the backsheet lamina. The resultant bilaminate can then be combined with the absorbent core 28 in a manner such that a portion of the adhesive foam remains exposed, preferably a portion around the entire periphery of the absorbent core. The topsheet 24 may then be affixed to the backsheet via the adhesive properties of the foam so as to form the diaper 20.

In an alternative embodiment, the adhesive foam is patterned on the backsheet lamina by means described herein. Preferably the foam is patterned onto those areas of the backsheet in which it is desirable to impart resilience, compressibility, elasticity, and/or adhesive properties without the use of external bonding agents. For example, the foam can be patterned onto the backsheet in those areas corresponding to the elasticized side panels 30, elastic waist feature 34, and/or elasticized leg cuffs 32. The foam may also be patterned onto areas to effect joinder of the absorbent core 28 and/or topsheet 24 via the adhesive properties of the foam. The foam pattern corresponding to the area between the absorbent core and the backsheet need not cover the entire area. For example, the pattern can be such to impart compressibility to areas particularly subjected to pressure while the diaper 20 is in use.

The backsheet 26, absorbent core material 28, and the elastomeric adhesive foam can be laminated by any of the methods previously described, including a pre-tensioned laminate, a "zero strain" laminate, a "zero strain" stretch laminate, and a mechanically stretched, pre-tensioned stretch laminate. In a preferred embodiment, a "zero strain" laminate of the backsheet 26, the absorbent core 28, and the topsheet 24 is formed. Portions of the resultant "zero strain" laminate are then mechanically stretched to form a "zero strain" stretch laminate. Mechanical stretching is preferably performed on those regions corresponding to the elasticized side panels 30, the elastic waist feature 34, and/or the elasticized leg cuffs 32.

In an alternative embodiment, the backsheet and absorbent core are joined by attachment means (not shown) such as those well known in the art. For example, the backsheet 26 may be secured to the absorbent core 28 by a uniform continuous layer of adhesive, a patterned layer of adhesive, or an array of separate lines, spirals, or spots of adhesive. Adhesives which have been found to be satisfactory are manufactured by H. B. Fuller Company of St. Paul, Minn. and marketed as HL-1258. The attachment means will preferably comprise an open pattern network of filaments of adhesive as is disclosed in U.S. Pat. No. 4,573,986, entitled "Disposable Waste-Containment Garment", which issued to Minetola, et al. on Mar. 4, 1986, more preferably several lines of adhesive filaments swirled into a spiral pattern such as is illustrated by the apparatus and methods shown in U.S. Pat. No. 3,911,173, issued to Sprague, Jr. on Oct. 7, 1975; U.S. Pat. No. 4,785,996, issued to Ziecker, et al. on Nov. 22, 1978; and U.S. Pat. No. 4,842,666, issued to Werenicz on Jun. 27, 1989. Each of these patents are incorporated herein by reference. Alternatively, the attachment means may comprise heat bonds, pressure bonds, ultrasonic bonds, dynamic mechanical bonds, or any other suitable attachment means or combinations of these attachment means as are known in the art.

The backsheet 26 is impervious to liquids (e.g., urine) and is preferably manufactured from thin plastic film, although other flexible liquid impervious materials may also be used. As used herein, the term "flexible" refers to materials which are compliant and will readily conform to the general shape and contours of the human body. The backsheet 26 prevents the exudates absorbed and contained in the absorbent core 28 from wetting articles which contact the diaper 20 such as bedsheets and undergarments. The backsheet 26 may thus comprise a woven or nonwoven material, polymeric films such as thermoplastic films of polyethylene or polypropylene, or composite materials such as a film-coated nonwoven material. Preferably, the backsheet comprises a thermoplastic film having a thickness of from about 0.012 mm (0.5 mil to about 0.051 mm (2.0 mils). Particularly preferred materials for the backsheet include RR8220 blown films and RR5475 cast films as manufactured by Tredegar Industries, Inc. of Terre Haute, Ind. The backsheet 26 is preferably embossed and/or matte finished to provide a more clothlike appearance. Further, the backsheet 26 may permit vapors to escape from the absorbent core 28 (i.e., breathable) while still preventing exudates from passing through the backsheet 26.

In a preferred embodiment of the present invention, at least a portion of the backsheet 26 is subjected to mechanical stretching as described herein in order to provide both a "zero strain" stretch laminate that forms the elasticized side panels 30 and to prestrain the portion of the backsheet coinciding with the elastic waist feature 34. Thus, the backsheet 26 is preferably elongatable, most preferably drawable, but not necessarily elastomeric, so that the backsheet 26 will, upon mechanical stretching, be at least to a degree permanently elongated such that it will not fully return to its original undistorted configuration. In preferred embodiments, the backsheet can be subjected to mechanical stretching without undue rupturing or tearing. Thus, it is preferred that the backsheet 26 have an ultimate elongation to break of at least about 400% to about 700% in the cross-machine direction as measured using a method consistent with ASTM D-638. The above noted ER8220 and RR5475 blends are suitable backsheet materials.

In yet another embodiment, the backsheet may be a laminate comprising at least one lamina of any of the foregoing backsheet materials and at least one lamina of the elastomeric adhesive foam of the present invention. For example, the backsheet laminate can comprise the elastomeric adhesive foam as a central lamina between two lamina of any of the foregoing backsheet materials, e.g., a nonwoven. The laminate may be formed by any of the methods described herein. Typically, a "zero strain" laminate will be formed. Preferably, at least a portion of the "zero strain" laminate is subjected to mechanical stretching in order to provide both a "zero strain" stretch laminate that forms the elasticized side panels 30 and to prestrain the portion of the backsheet 26 laminate coinciding with the elastic waist feature, as previously described. In yet another embodiment, the backsheet lamina(e) of the laminate is prestretched as described herein. The laminate can then be constructed and incorporated into the diaper 20 as previously described.

The topsheet 24 is positioned adjacent the body surface of the absorbent core 28 and is preferably joined thereto and to the backsheet 26 by the elastomeric adhesive foam in the manner described in reference to joinder of the backsheet 26 and absorbent core 25. Alternatively, the topsheet can be joined to those components by attachment means (not shown) such as those well known in the art. Suitable attachment means are described with respect to joining the backsheet 26 to the absorbent core 28. In a preferred embodiment of the present invention, the topsheet 24 and the backsheet 26 are joined directly to each other in the diaper periphery 60 by the adhesive foam and are indirectly joined together by directly joining them to the absorbent core 28 by the elastomeric adhesive foam and/or other attachment means (not shown).

The topsheet 24 is compliant, soft feeling, and non-irritating to the wearer's skin. Further, the topsheet 24 is liquid pervious permitting liquids (e.g., urine) to readily penetrate through its thickness. A suitable topsheet may be manufactured from a wide range of materials, such as porous foams; reticulated foams; apertured plastic films; or woven or nonwoven webs of natural fibers (e.g., wood or cotton fibers), synthetic fibers (e.g., polyester or polypropylene fibers), or a combination of natural and synthetic fibers. There are a number of manufacturing techniques which may be used to manufacture the topsheet 24. For example, the topsheet 24 may be a nonwoven web of fibers spunbonded, carded, wet-laid, meltblown, hydroentangled, combinations of the above, or the like. A preferred topsheet is carded and thermally bonded by means well known to those skilled in the fabrics art. A preferred topsheet comprises a web of staple length polypropylene fibers such as is manufactured by Veratec, Inc., a Division of International Paper Company, of Walpole, Mass. under the designation P-8.

In a preferred embodiment of the present invention, at least a portion of the topsheet 24 is subjected to mechanical stretching as described herein in order to provide a "zero strain" stretch laminate that forms the elasticized side panels 30. Thus, the topsheet 24 is preferably elongatable, most preferably drawable, but not necessarily elastomeric, so that the topsheet 24 will, upon mechanical stretching, be at least to a degree permanently elongated such that it will not fully return to its original configuration. In preferred embodiments, the topsheet 24 can be subjected to mechanical stretching without undue rupturing or tearing of the topsheet. Thus, it is preferred that the topsheet 24 have a low cross-machine direction (lateral direction) yield strength. The P-8 topsheet (Veratec, Inc) is a suitable topsheet material.

In yet another embodiment, the topsheet 24 may be a laminate comprising at least one lamina of any of the foregoing topsheet materials and at least one lamina of the elastomeric adhesive foam of the present invention. The topsheet 24 laminate may be formed in the manner described for the backsheet 26 laminate. Preferably, at least a portion of the topsheet 24 laminate is subjected to mechanical stretching in order to form a zero-strain stretch laminate that forms the elasticized side panels 30. In a preferred embodiment, the topsheet 24 laminate has a configuration as described in U.S. Pat. No. 5,037,416 issued to Allen, et al. on Aug. 6, 1991. The topsheet laminate preferably has a liquid pervious zone as described therein.

The diaper 20 preferably further comprises elasticized leg cuffs 32 for providing improved containment of liquids and other body exudates. Each elasticized leg cuff 32 may comprise several different embodiments for reducing the leakage of body exudates in the leg regions. (The leg cuff can be and is sometimes also referred to as leg bands, side flaps, barrier cuffs, or elastic cuffs.) U.S. Pat. No. 3,860,003, issued to Buell on Jan. 14, 1975 (Reexamination Certificate BI 3,860,003 issued Apr. 18, 1989), describes a disposable diaper which provides a contractible leg opening having a side flap and one or more elastic members to provide an elasticized leg cuff (gasketing cuff). U.S. Pat. No. 4,909,803, entitled "Disposable Absorbent Article Having Elasticized Flaps" issued to Aziz et al. on Mar. 20, 1990, describes a disposable diaper having "stand-up" elasticized flaps (barrier cuffs) to improve the containment of the leg regions. U.S. Pat. No. 4,695,278, entitled "Absorbent Article Having Dual Cuffs" issued to Lawson on Sep. 22, 1987, describes a disposable diaper having dual cuffs including a gasketing cuff and a barrier cuff. While each elasticized leg cuff 32 may be configured so as to be similar to any of the leg bands, side flaps, barrier cuffs, or elastic cuffs described above, it is preferred that each elasticized leg cuff 32 comprise at least an inner barrier cuff comprising a barrier flap and a spacing elastic member such as described in the above referenced U.S. Pat. No. 4,909,803. In a preferred embodiment, the elasticized leg cuff additionally comprises an elastic gasketing cuff with one or more elastic strands positioned outboard of the barrier cuff such as described in the above referenced U.S. Pat. No. 4,695,278.

The elastic members of the leg cuffs may comprise the elastomeric adhesive foam of the present invention. In a preferred embodiment, the elastic members are formed by mechanically stretching those regions of a "zero strain" laminate previously formed in at least the cuff regions.

Alternatively, the elastomeric adhesive foam may be incorporated into the cuff by forming the foam in a rotary mold having a shape suitable for the elastic member. The shaped elastomeric adhesive foam may then be pre-stretched and affixed in a contractible condition. The shaped foam may alternatively be laminated in an untensioned condition in the leg cuff, followed by mechanically stretching the laminated portions so as to form a "zero strain" stretch laminate in the cuff region. In yet another embodiment, the foam is applied prestretched followed by mechanical stretching to form a mechanically stretched, pretensioned, stretch laminate.

The diaper 20 preferably further comprises an elastic waist feature 34 that provides improved fit and containment. The elastic waist feature 34 is that portion or zone of the diaper 20 which is intended to elastically expand and contract to dynamically fit the wearer's waist. The elastic waist feature 34 at least extends longitudinally outwardly from at least one of the waist edges of the absorbent core 28 and generally Forms at least a portion of the end edge 64 of the diaper 20. Disposable diapers are generally constructed so as to have two elastic waist features, one positioned in the first waist region and one positioned in the second waist region, although diapers can be constructed with a single elastic waist feature. Further, while the elastic waist feature or any of its constituent elements can comprise a separate element affixed to the diaper 20, the elastic waist feature 34 is preferably constructed as an extension of other elements of the diaper such as the backsheet 26 or the topsheet 24, preferably both the backsheet 26 and the topsheet 24.

The elasticized waistband 35 of the elastic waist feature 34 may be constructed in a number of different configurations including those described in U.S. Pat. No. 4,515,595, issued to Kievit et al. on May 7, 1985, incorporated herein by reference; and the above referenced U.S. Pat. No. 5,151,092, issued to Buell, et al. on Sep. 29, 1992. The elasticized waistband of the elastic waist feature preferably comprises the elastomeric adhesive foam of the present invention.

In a particularly preferred embodiment, the elastic waist feature is constructed according to any of the waist feature configurations described in the above referenced U.S. Pat. No. 5,151,092, issued to Buell, et al. on Sep. 29, 1992, in which the elastomeric member 76 of the elasticized waistband 35 comprises the elastomeric adhesive foam of the present invention. As shown in FIG. 4, the elasticized waistband 35 preferably comprises at least three materials laminated together. The elasticized waistband 35 preferably comprises a portion of the topsheet 24; a portion of the backsheet 26, this portion of the backsheet being preferably "mechanically prestrained"; and an elastomeric member 76 comprising the elastomeric adhesive foam of the present invention. The elasticized waistband can also comprise a resilient member 77. The resilient member 77 is preferably joined to the elastomeric member 76 with the resilient member 77 disposed toward the backsheet 26 and the elastomeric member 76 disposed toward the topsheet 24. The elastomeric member 76 and the resilient member are also shown in FIG. 3.

While the preferred elastic waist feature 34 need only comprise an elasticized waistband and a flexural hinge zone joining the elasticized waistband with the containment assembly 22; as shown in FIG. 5 the elastic waist feature 34 more preferably comprises several additional zones such as described in the above referenced U.S. Pat. No. 5,151,092 issued to Buell, et at., incorporated herein by reference. In particular, the elastic waist feature 34 comprises an interconnecting panel zone 130, a first flexural hinge zone 132 joining the interconnecting panel zone 130 with the containment assembly 22 adjacent the waist edge 83 of the absorbent core 28, an elasticized waistband 35, and a second flexural hinge zone 134 joining the elasticized waistband 35 with the interconnecting panel zone 130. The interconnecting panel zone 130 preferably provides a flexible link between the elasticized waistband 35 and the containment assembly 22. The elasticized waistband 35 provides a member that maintains a defined area coverage, contacts the wearer's waist, and is elastically extensible in at least the lateral direction so as to dynamically fit against the waist of the wearer and to dynamically conform to the waist of the wearer so as to provide improved fit. As shown in FIG. 5, the elasticized waistband 35 comprises a shaping panel zone 136; a waistline panel zone 138; and a predisposed, resilient, waistband flexural hinge zone 140 joining the shaping panel zone 136 and the waistline panel zone 138. As used herein, the term "zone" is used to denote an area or element of the elastic waist feature 34. While a zone of the elastic waist feature 34 may be a distinct area or element; typically, a zone of the elastic waist feature will overlap somewhat with an adjacent zone(s). (For illustration purposes, the zones are delineated with brackets in FIG. 5.)

The elastomeric member 76 is operatively associated with the elasticized waistband 35, preferably between the topsheet 24 and the backsheet 26. so that the elastomeric member 76 allows the elasticized waistband 35 to be elastically extensible in the lateral direction (i.e.. laterally elastically extensible), and so that it can contractively return to its substantially unrestrained configuration.

The elastomeric member 76 can be operatively associated in the elasticized waistband 35 in a number of different ways. In a preferred embodiment, the elastomeric member 76 is associated in the elasticized waistband 35 in the form of a "zero strain" laminate. In a preferred embodiment, at least the regions of the "zero strain" laminate corresponding to the elasticized waist band 35 are mechanically stretched to form a "zero strain" stretch laminate.

In an alternative embodiment, the elastomeric member may be operatively associated in an elastically contractible condition as described herein so that the elastomeric member gathers or contracts the elasticized waistband. For example, the elastomeric member may be a shaped foam (e.g., as prepared in a rotary mold). The shaped elastomeric members 76 can be contractibly affixed in the elasticized waistband 35 by laterally extending the elastomeric member 76, affixing the elastomeric member 76 to either or both the topsheet 24 and the backsheet 26, and allowing the elastomeric member 76 to assume its relaxed or contracted orientation.

Alternatively, the shaped elastomeric member 76 can be operatively associated in the elasticized waistband 35 by securing the elastomeric member 76 to the topsheet 24, the backsheet 26, or both while the elastomeric member 76 is in a substantially untensioned condition (i.e., "zero strain"), at least a portion of the laminate containing the elastomeric member 76 then being subjected to mechanical stretching sufficient to permanently elongate the topsheet 24 and the backsheet 26 components of the laminate, followed by returning the composite or elastomeric laminate to its substantially untensioned condition to form a "zero strain" stretch laminate. Any of the methods previously described for forming a "zero strain" stretch laminate may be used. The elastomeric member 76 may alternatively be operatively associated in a tensioned condition (prestretched or pretensioned) followed by mechanical stretching to form a mechanically stretched, pretensioned, stretch laminate, as described herein.

The elastomeric members 76 useful in the present invention may take on a number of different sizes, shapes, configurations, and materials. For example, the elasticized waistband 35 may be formed from one or a plurality or elastomeric members operatively associated between the topsheet and the backsheet; the elastomeric member 76 may have varying widths and lengths; or the elastomeric member 76 may comprise relatively narrow strands of elastomeric material or a larger area patch of elastomeric material. In addition to the elastomeric adhesive foams of the present invention, the elastomeric member may also include known materials, e.g. elastomeric foam such as the polyurethane foam available from Bridgestone of Yokahama, Japan and designated Bridgestone SG Polyurethane Foam. Other suitable elastomeric materials for use in the elastomeric member 76 include "live" synthetic or natural rubber, elastomeric films (including heat-shrinkable elastomeric films), formed elastomeric scrim, or the like. Where such conventional elastomers are used, it may be necessary or desired to use external bonding agents as are known in the art to operatively associate the elastomeric member 76 with another diaper component.

In a preferred embodiment of the present invention, the portion of the backsheet 26 forming the elasticized waistband 35 has been "prestrained" or "mechanically prestrained" (i.e., subjected to some degree of localized pattern mechanical stretching to permanently elongate those portions of the backsheet forming the elasticized waistband 35). A prestrained backsheet improves the extension and contraction of the elastomeric member 76. The backsheet 26 of the present invention can be prestrained as described in the above referenced U.S. Pat. No. 5,151,092 issued to Buell, et al. on Sep. 29, 1992, e.g., by directing the backsheet through an incremental mechanical stretching system as described therein. The backsheet can alternatively be prestrained by using deep embossing techniques as are known in the art.

In a preferred method for making the diapers of the present invention, after the backsheet web has been prestrained, and after the backsheet web has been removed from the corrugated combining rolls, a laminate comprising a center lamina of the elastomeric adhesive foam of the present invention positioned between a lamina of the prestrained backsheet and a lamina of the topsheet is formed as previously described to form the elasticized waistband 35.

In an alternative embodiment, the elasticized waistband in the second waist region 58 (or the first waist region 56 if elasticized side panels are disposed therein) and the elasticized side panels 30 can comprise a continuous elastomeric member, e.g., a continuous piece of the elastomeric adhesive foam, in both the side panels 72 and the central region 68 of the second waist region 58. Thus, the elasticized waistband 35 and the elasticized side panels 30 can be formed from the same piece of elastomeric adhesive foam to form a unitary structure. An example of such an elasticized waistband/side panel configuration is disclosed in the hereinbefore referenced U.S. Pat. No. 4,887,067, issued to Wood, et al. on Aug. 15, 1989, and which patent is incorporated herein by reference.

In a further alternative embodiment of the present invention, the elasticized waistband 35 may have differential extensibility along the longitudinal axis when stretched in the lateral direction. The differential extensibility of the elasticized waistband 35 allows portions to laterally expand to a greater degree than other portions along the longitudinal axis. This differential extensibility of the elasticized waistband provides an abdominally compliant elasticized waistband, i.e., an "expansive tummy panel", that allows the elasticized waistband to differentially shape, expand, and move with the stomach of the wearer as the wearer moves, sits, and stands. Differential extensibility along the longitudinal axis when stretched in the lateral direction of the elasticized waistband can be achieved in a number of ways such as is discussed with respect to the elasticized side panels 30. A preferred differential extensibility elasticized waistband has a pentagonal shape.

In a preferred embodiment, the diaper also comprises elasticized side panels 30 disposed in the second waist region 58. (As used herein, the term "disposed" is used to mean that an element(s) of the diaper is formed (joined and positioned) in a particular place or position as a unitary structure with other elements of the diaper or as a separate element joined to another element of the diaper.) The elasticized side panels 30 provide an elastically extensible feature that provides a more comfortable and contouring fit by initially conformably fitting the diaper to the wearer and sustaining this fit throughout the time of wear well past when the diaper has been loaded with exudates since the elasticized side panels allow the sides of the diaper to expand and contract. The elasticized side panels 30 further provide more effective application of the diaper 20 since even if the diaperer pulls one elasticized side panel 30 farther than the other during application (asymmetrically), the diaper 20 will "self-adjust" during wear. While the diaper 20 of the present invention preferably has the elasticized side panels 30 disposed in the second waist region 58; alternatively, the diaper 20 may be provided with elasticized side panels 30 disposed in the first waist region 56 or in both the first waist region 56 and the second waist region 58. The elastic side panel members 90 preferably comprise the elastomeric adhesive foam of the present invention.

While the elasticized side panels 30 may be constructed in a number of configurations, examples of diapers with elasticized side panels positioned in the ears (ear flaps) or the diaper are disclosed in U.S. Pat. No. 4,857,067, entitled "Disposable Diaper Having Shirred Ears" issued to Wood, et al. on Aug. 15, 1989; U.S. Pat. No. 4,381,781, issued to Sciaraffa., et al. on May 3, 1983; U.S. Pat. No. 4,938,753, issued to Van Gompel, et al. on Jul. 3, 1990; and the hereinbefore referenced U.S. Pat. No. 5,151,092, issued to Buell et al. on Sep. 29, 1992; each of which are incorporated herein by reference. Thus, the elasticized side panels 30 of the present invention may comprise a separate elastically extensible material or laminate joined to the diaper. As shown in FIG. 3, each elasticized side panel 30 preferably comprises an ear flap 88 and an elastic side panel member 90 operatively associated therewith, such as described in the above referenced U.S. Pat. No. 5,151,092 issued to Buell, et al., on Sep. 29, 1992.

As shown in FIG. 3, each ear flap 88 comprises that portion of the side panel 72 that extends laterally outwardly from and along the side edge 82 of the absorbent core 28 to the longitudinal edge 62 of the diaper 20. The ear flap 88 generally extends longitudinally from the end edge 64 or the diaper 20 to the portion of the longitudinal edge 62 of the diaper 20 that forms the leg opening (this segment of the longitudinal edge 62 being designated as leg edge 106). In a preferred embodiment of the present invention, each ear flap 88 in the second waist region 58 is formed by the portions of the topsheet 24 and the backsheet 26 that extend beyond the side edge 82 of the absorbent core 28.

In a preferred embodiment of the present invention, the elastic side panel members 90 are operatively associated with the diaper 20 in the ear flaps 88, preferably between the topsheet 24 and the backsheet 26, so that the elastic side panel members 90 allow the elasticized side panels 30 to be elastically extensible in the lateral direction (laterally elastically extensible). As used herein, the term "elastically extensible" means a segment or portion of the diaper that will elongate in at least one direction (preferably the lateral direction for the side panels and the waistbands) when tensional forces (typically lateral tensional forces for the side panels and the waistbands) are applied, and will return to about its pervious size and configuration when the tensional forces are removed. Generally, elastomeric materials useful in the present invention will contractively return to at least about 75% of their original configuration within about 15 seconds or less, preferably within about 5 seconds or less, upon stretch and immediate release thereof (i.e., a "snappy" elastic).

The elastic side panel members 90 can be operatively associated in the ear flaps 88 in a number of different ways, preferably in any of the ways described in the above referenced U.S. Pat. No. 5,151,092 issued to Buell, et al. on Sep. 29, 1992. In an especially preferred embodiment, the elastic side panel member 90 is operatively associated in the ear flap 88 in the form of a "zero strain" stretch laminate, such as previously described. Thus, the elastic side panel member 90 is joined to the topsheet 24, the backsheet 26, or both while the elastic side panel member 90 is in a substantially untensioned condition. The elastic side panel member 90 comprising the elastomeric adhesive foam is preferably operatively associated in the ear flap 88 by forming a "zero strain" laminate of the adhesive foam, backsheet, and topsheet as previously described. At least a portion of the resultant laminate containing the elastic side panel member 90 is then subjected to mechanical stretching sufficient to permanently elongate the topsheet and the backsheet components (typically nonelastic components) of the laminate. The composite elastomeric laminate is then allowed to return to its substantially untensioned condition to form the "zero strain" stretch laminate. (Alternatively, the elastic side panel member 90 could be operatively associated in a tensioned condition and then subjected to mechanical stretching; although this is not as preferred as a "zero strain" stretch laminate.)

In yet another embodiment, the elastic side panel member 90 may be operatively associated in an elastically contractible condition as described herein so that the elastic side panel member 90 gathers or contracts the ear flap 88. For example, the elastic side panel members 90 can be contractibly affixed in the ear flap 88 by laterally extending the elastic side panel member 90, joining the elastic side panel member 90 to either or both the topsheet 24 and the backsheet 26, and allowing the elastic side panel member 90 to assume its relaxed or contracted orientation. For such pretensioned laminates, the elastic side panel member 90 will preferably be a shaped elastomeric adhesive foam of the present invention, e.g., as formed by a rotary mold.

The elastic side panel members 90 may take on a number of different sizes, shapes, configurations and materials. For example, the elasticized side panels 30 may be formed from one or a plurality of elastic side panel members 90 operatively associated in each ear flap 88, the elastic side panel members 90 may have varying widths and lengths, or the elastic side panel members 90 may comprise relatively narrow strands of elastomeric material or a larger area elastomeric patch. Elastomeric materials which are especially suitable for use as the elastic side panel member 90 (especially for "zero strain" stretch laminates) have an elongation to break of at least about 400% and an extension force of about 300 grams per inch of sample width at 50% extension of its unstrained length. In addition to the elastomeric adhesive foam of the present invention, other suitable elastomeric materials for use as the elastic side panel members 90 include crosslinked natural rubber foams, polyurethane foams, "live" synthetic or natural rubber, other synthetic or natural rubber foams, elastomeric films (including heat shrinkable elastomeric films), elastomeric scrim, elastomeric woven or nonwoven webs, elastomeric composites such as elastomeric nonwoven laminates, or the like. Such materials may be used in combination with the elastomeric adhesive foam of the present invention, e.g., in laminate form, as the side panel members 90. An external bonding agent such as those described herein may be desired in order to operatively associate such materials in the side panels.

As shown in FIG. 3, the elastic side panel member 90 comprises a patch of elastomeric material (elastomeric patch, preferably the elastomeric adhesive foam of the present invention) that preferably extends through a majority of the length of the car flap 88 in the second waist region 58. When the diaper is manufactured, the elastomeric patch is preferably positioned so that it forms not only the elastic side panel member 90 of one diaper but also the positioning patch 50 in the first waist region 56 of the adjacent diaper. Thus, the elastic side panel member 90 preferably extends from the end edge 64 of the diaper 20 inward toward the leg edge 106 of the ear flap 88. The length and width of the elastic side panel members 90 are dictated by the diaper's functional design.

While the elastic side panel member 90 may longitudinally extend through the entire length of the ear flap 88, it is preferred that the elastic side panel member 90 extend through only a portion of the length of the ear flap 88 so as to form an extension panel 110. As shown in FIG. 3, the extension panel 110, the portion of the elasticized side panel longitudinally extending from the base edge 108 of the elastic side panel member 90 to the leg edge 106 of the ear flap 88, has also been mechanically stretched at least to a degree to be extensible (i.e., the materials that make up the extension panel 110 have been prestrained or permanently elongated). While there are a number of ways to prestrain the extension panel 110 of the elasticized side panels 30, the extension panel 110 is preferably prestrained in the same manner as the mechanical stretching performed on the "zero strain" stretch laminate portion. While the extension panel 110 of the elasticized side panels 30 may be formed from a number of different materials, in the preferred embodiment shown in FIG. 3, the extension panel 110 is formed from the portions of the topsheet 24 and the backsheet 26 forming the ear flap 88.

The extension characteristics including the extension forces (i.e., force of elongation), extension modulus, and available stretch (extension); the contractive forces; elastic creep; elastic hysteresis; and rate of contraction of the elasticized side panels 30 are important considerations in the performance or both the elasticized side panels 30 and the diaper 20. The extension characteristics give the diaperer and wearer the overall perceived "stretchiness" during use. They also effect the ability of the diaperer to achieve a suitable degree of application stretch (i.e., for a "normally" perceived tensioning of the diaper during application, the total amount of resultant stretch is that desired to achieve/maintain good conformity of fit). An elasticized side panel with a relatively high extension modulus can cause red marking on the wearer's skin while a relatively low extension modulus can cause sagging/slipping on the wearer. Elasticized side panels having too little available stretch may not achieve a suitable level of body conformity and may contribute in making the diaper uncomfortable to wear and hard to don. A diaper having elasticized side panels with very low contractive forces, or poor elastic creep or elastic hysteresis may not stay in place on the wearer and may tend to sag/slip on the wearer resulting in poor fit and containment.

For the elasticized side panels 30 of the present invention, it has been found that the extension characteristics of extension force and extension modulus are preferably within defined ranges. The extension force preferably is greater than or equal to about 250 grams$_f$. It is preferred that these extension forces be generated at extensions between about 0.25 inches (6.25 mm) and about 1.25 inches (31.25 mm). For the most preferred embodiments, the elasticized side panels preferably have an extensional force between about 250 grams$_f$ and about 500 grams$_f$ at an extension of between about 0.25 inches (6.25 mm) and about 0.75 inches (18.75 mm). An extension force test suitable for use herein is described in detail in the above referenced U.S. Pat. No. 5,151,092 issued to Buell, et al. on Sep. 29, 1992.

Available stretch measures the maximum amount of material available in the elasticized side panels to reversibly stretch to conform to the wearer's body during wear. Thus, the amount of available stretch relates to the maximum amount of extension that the diaperer has available to fit the diaper to the wearer. In addition, it relates to the maximum amount of recoverable extension available for the diaper to conform to the wearer's body. The available stretch is calculated from the equation: ((stretched length–original length)–original length)×100. The minimum amount of available stretch required for a diaper application using elasticized side panels is preferably an available stretch of at least about 35% for medium sized diapers and at least about 50% for large sized diapers.

The amount of sustainable contractive force (tension) exerted by the elasticized side panel 30 on the wearer is an important property of the elasticized side panel. An elasticized side panel with insufficient contractive forces may result in the diaper slipping down after being worn and loaded. Excessive contractive forces may reduce the comfort for the wearer and produce pressure markings on the wearer's skin. Contractive force is measured as the force per unit width produced while relaxing an elastomeric composite at a particular extension. In preferred embodiments of the present invention, the contractive force of the elasticized side panels is preferably at least about 90 grams/inch at 50% extension (a 50% extension would require the sample to be stretched to 1.5 times its original length).

Typical elastomeric materials show a hysteresis loop of force in their stress-strain property. That is, for a given extension, the force (extension force) required to uniaxially extend the elastomeric material is greater than the force (contractive force) the elastomeric material exerts when it is allowed to contract from its pre-extended condition. The former curve can be referred to as the "load curve" and the latter curve can be referred to as the "unload curve". The "load" extension force (extension force) is felt by the diaperer when the elasticized side panel is stretched to apply the diaper to the wearer. The wearer more nearly "feels" the "unload" contractive forces (contractive forces) once the diaper is on. Therefore, the hysteresis loss should not be so great that the contractive force is low enough to allow sagging/slipping of the diaper on the wearer.

All elastomeric materials undergoing sustained stress/strain have diminishing forces with time (i.e., elastic creep). Therefore, it is desired to make sure this reduction in wearing forces over time doesn't fall below a minimum for wearing stability. The elastic creep should therefore be kept at a minimum. In preferred embodiments of the present invention, the final length of the elastomeric material is not greater than about 1.2 times the original length under tension for 30 minutes. The extension forces and available stretch of the elasticized waistband 35 can be important considerations in the performance of both the elasticized waistband 35 and the elasticized side panels 30. While the extension forces of the elasticized waistband 35 may be greater than the extension forces of the elasticized side panels 30, in a preferred embodiment of the present invention, the extension forces of the elasticized waistband 35 at its designed extensions is less than or equal to the extension forces of each elasticized side panel 30 at its designed extensions. An elasticized waistband 35 having lower extension forces than that of the elasticized side panels 30 provides for easy stomach movement without displacing the diaper on the child. The higher extension force elasticized side panels allow for small dimensional changes over the hip and under the stomach to keep the product comfortably in tension on the wearer. This design provides better fit, less leakage and improved comfort for the wearer through the reduction of sagging, gapping, rollover and roll-in at the front of the diaper and overall sliding/slipping of the diaper or diaper absorbent core on the wearer during use.

The elasticized side panels 30 may also be provided with differential extensibility along the longitudinal axis when stretched in the lateral direction. As used herein, the term "differential extensibility" is used to mean a material having a nonuniform degree of elastic extensional properties, as measured in the direction of stretching at various points along an axis oriented substantially perpendicular to the direction of stretching. This may, for example, include varying the elastic modulus or available stretch or both of the elastomeric material(s). The differential extensibility is preferably designed into the elasticized side panels 30 so that the lateral extensibility varies longitudinally through at least a portion of the elasticized side panel as measured from the end edge 64 of the diaper 20 to the leg edge 106 of the ear flap 88. In an alternative embodiment, a degree of reduced lateral extensibility in the portion of the elasticized side panel adjacent to the end edge 64 of the diaper 20 requires more of the total extension to be assumed by the elasticized waistband 35 thereby resulting in more localized stretching of the elasticized waistband 35 and a more compliant abdominal fit.

The differential extensibility can be achieved in a number of different ways. The elasticized side panels 30 can have multiple combined elastomeric materials, multiple configurations for the elastomeric materials, or the extension properties or the elastomeric or other material or materials making up the elasticized side panel may be nonuniform, For example. differential extensibility can be achieved in selected adjacent portions or the elasticized side panel by using elastomeric materials having varying extension or contractive forces, modulus, or other inherent properties such that more or less (varying) lateral extensibility is achieved in one portion of the elasticized side panel than the adjacent portion. The elastomeric materials may also have varying lengths, sizes, and shapes that provide differential extensibility Other ways of varying the properties of materials that form the elasticized side panels as are known in the an may also be used.

A particularly preferred method and apparatus for imparting a varying degree of extensibility to a "zero strain" stretch laminate is to pass the "zero strain" stretch laminate through at least one set of meshing corrugated rolls, at least one of the corrugated rolls having corrugations of nonuniform profile along its point or points of contact with the "zero strain" stretch laminate web. As a result, the portions of the laminate web passing between the set of rolls are nonuniformly stretched. This, in turn, produces a "zero strain" stretch laminate which is nonuniformly elasticized in a direction substantially perpendicular to the nonuniformly profiled corrugations.

The diaper 20 also comprises a fastening system 36 which forms a side closure which maintains the first waist region 56 and the second waist region 58 in an overlapping configuration such that lateral tensions are maintained around the circumference of the diaper to maintain the diaper on the wearer. Exemplary fastening systems are disclosed in U.S. Pat. No. 4,846,815, entitled "Disposable Diaper Having An Improved Fastening Device" issued to Scripps on Jul. 11, 1984; U.S. Pat. No. 4,894,060, entitled "Disposable Diaper With Improved Hook Fastener Portion" issued to Nestegard on Jan. 16, 1990; U.S. Pat. No. 4,946,527, entitled "Pressure-Sensitive Adhesive Fastener And Method of Making Same" issued to Bartfell on Aug. 7, 1990; U.S. Pat. No. 3,848,594 entitled "Tape Fastening System for Disposable Diaper" issued to Buell on Nov. 19, 1974; U.S. Pat. No. B1 4,662,875, entitled "Absorbent Article" issued to Hirotsu et at. on May 5, 1987; and the hereinbefore referenced U.S. Pat. No. 5,151,092, issued to Buell et al. on Sep. 29, 1992; each of which is incorporated herein by reference. In a preferred embodiment, the fastening system comprises a dual tension fastening system as described in the U.S. Pat. No. 5,151,092.

The diaper 20 is preferably applied to a wearer by positioning one of the waist regions, preferably the second waist region 58, under the wearer's back and drawing the remainder of the diaper between the wearer's legs so that the other waist region, preferably the first waist region 56, is positioned across the front of the wearer. The tape tabs of the fastening system are then released from the release portion. The diaperer then wraps the elasticized side panel around the wearer, while still grasping the tab portion. The elasticized side panels will typically be extended and tensioned during this operation so as to conform to the size and shape of the wearer. The fastening system is secured to the outer surface of the diaper to effect a side closure.

EXAMPLES

A) Preparation of elastomeric, hot-melt, pressure-sensitive adhesive compositions Compositions having the formulas shown in Table I may be prepared in the following manner:

The oil and stabilizer are placed in a Baker-Perkins type jacketed heavy duty mixer equipped with rotors and the temperature of the mixture is raised to about 250° o to 350° F. in order to melt the ingredients. The mixture is then blanketed with $CO_2$ at a slow flow rate. The aromatic modified hydrocarbon resins are then slowly added and melted at a temperature of from about 250° F. to about 350° F. The block copolymer is then added to the mixture. The mixture is then agitated until the copolymer is completely melted. A vacuum is then applied to remove any entrapped air.

The properties of the adhesive compositions may be tested by the following methods:

Viscosity: The viscosity of the composition is measured at a temperature of 325° F. using a Brookfield Thermosel, in accordance with ASTM Method D3236-73.

Elastomeric Retention: This measures the force of recovery exhibited by a sample of the composition following its elongation during a predetermined interval of time. Samples of the composition are coated on double-sided release paper using an Acumeter LH1 coater. The coating of the composition is approximately 5 mils thick and approximately 1.5 inches (38.1 mm) wide. The samples to be tested are rewound onto themselves. Following a period of storage for 24 hours, the samples to be tested are cut, in the machine direction, to a width of approximately 1 inch (25.4 mm), thereby eliminating any flaws in the samples which could exist along the edges of same. Samples are then cut to the appropriate length and placed in an insiron Series IX Tensile Tester. Each sample is then elongated or pulled to a distance which represents an elongation equal to 40%, and in a second series of tests, 80% of its unstressed length, at a rate of 20 inches per minute (50.8 cm/min.). The samples are held at these distances for a period &thirty (30) seconds. The sample is subjected to 2 holding periods at each elongation. Following the first holding period, the force of elongation is removed, thereby permitting the sample to return or retract toward its original length. The sample is then rested for 1 minute. Following the period of rest, the force of elongation is again applied for a second holding period to extend the sample to the same distance at the same rate of speed, (50.8 cm/min). Measurements of the elastomeric recovery force exhibited by the sample are taken at the beginning of the test, at the beginning of the first holding period; at the end of the second holding period; and at the end of the second cycle. The percent elastomeric retention is calculated by the following formula:

[(force exerted by the sample at the end of the second holding period)/(force exerted at the beginning of the first holding period)]×100=% elastomeric retention Rate of Recovery: The rate or recovery is measured using a RDA 700 (Rheometrics, Inc.) rheometer in a stress relaxation test mode. The sample to be tested is positioned between opposing plates of the rheometer and one of the plates is rotated 180° o relative to the other, stationary plate. This rotation represents a 50% rotation deformation or the sample. The force of rotation is then released and the residual energy of the recovering sample is measured, each second, for a 60 second period In this particular test, a fully recovered sample is arbitrarily given a $0.01×10^3$ dynes/cm$^2$ per second or less recovery rate. The time required to realize a fully relaxed sample following deformation is observed. In another test, an initial force is placed on each of the samples, thereby rotatingly deforming the samples by 50%. For calculation purposes, a base line stress is taken following a period of 60 seconds of relaxation. Any stress remaining in the samples following this 60 second recovery period is considered negligible. The amount or force or residual energy remaining in the individual samples following this deformation is then collected during each second, for a period of 60 seconds. Thereafter, the total energy storage of each of the samples is calculated using the formula, below:

$$\frac{\text{dynes/cm}^2}{\text{second}} \times 60 \text{ seconds} = \begin{array}{l}\text{residual energy exhibited}\\ \text{during the 60 second test}\end{array}$$

Assuming a perfectly elastic sample, the amount of residual energy remaining in a sample following the release of the deformation force would be zero. It should be understood, therefore, that as the residual energy values for each of the samples near zero, the elastic recovery properties of the samples improves.

The resulting compositions would have the properties given in Table I. The properties of Comparative Examples 1 (Finalley 198–338) and 2 (based on the teaching of above referenced patents issued to Bunnelle) are also shown in Table I. As shown in Table I, the viscosity of the composition decreases with an increase in styrene content of the copolymer. Table I also shows that, the higher the styrene content, the faster the elastomeric recovery rate and the lower the residual energy.

TABLE I

|  | Ex. 1 | Ex. 2 | Ex. 3 | Ex. 4 | Ex. 5 | Comparative Ex. 1 | Comparative Ex. 2 |
| --- | --- | --- | --- | --- | --- | --- | --- |
| COMPONENT |  |  |  |  |  |  |  |
| Vector 4111 | 45 | — | — | — | — |  |  |
| Vector 4211 | — | 45 | — | 45 | 45 |  |  |
| Vector 4411 | — | — | 45 | — | — |  |  |
| ECR 165A | 40 | — | — | — | — |  |  |
| ECR 165C | — | 40 | — | — | 40 |  |  |
| Zonatac Lite 105 | — | — | 40 | 40 | — |  |  |
| Kaydol | 15 | 15 | 15 | 15 |  |  |  |
| Witco Plastics Oil 380 | — | — | — | — | 15 |  |  |
| Mark 273 | 0.5 | 0.5 | 0.5 | — | 0.5 |  |  |

TABLE I-continued

|  | Ex. 1 | Ex. 2 | Ex. 3 | Ex. 4 | Ex. 5 | Comparative Ex. 1 | Comparative Ex. 2 |
|---|---|---|---|---|---|---|---|
| Irganox 1010 | 0.25 | 0.25 | 0.25 | 0.25 | 0.25 |  |  |
| Cyanox LTDP | 0.25 | 0.25 | 0.25 | 0.25 | 0.25 |  |  |
| PROPERTY |  |  |  |  |  |  |  |
| Viscosity at 325° F., cP | 34,000 | 23,300 | 11,125 | 21,000 | 25,250 | 77,000 | >$10^6$ |
| Elastomeric retention, % | 84.19 | 89.7 | 84.7 | 93.3 | 90.5 | 44.76 | 68.47 |
| Recovery rate, sec | 11 | 11 | <1 | 11 | 11 | 31 | 32 |
| Residual energy/60 sec, dynes/cm$^2$ × $10^5$ | 5.924 | 4.591 | 0.01 | 4.809 | 4.804 | 15.340 | 18.534 |
| Coupling, % | 100 | 100 | 100 | 100 | 100 | 80 | — |

Description of Components:
Vector 4111 — S-I-S block copolymer, Dexco Chemical Co., 17% styrene
Vector 4211 — S-I-S block copolymer, Dexco Chemical Co.. 29% styrene
Vector 4411 — S-I-S block copolymer, Dexco Chemical Co., 44% styrene
ECR 165A — aromatic modified hydrocarbon resin, Exxon Chemical Co.
ECR 165C — aromatic modified hydrocarbon resin, Exxon Chemical Co.
Zonatac 105 Lite — aromatic modified hydrocarbon resin, Arizona Chemical Co.
Kaydol — paraffinic/napthenic white processing oil, Witco Chemical Co.
Witco Plastics Oil 380 — paraffinic/napthenic processing oil, Witco Chemical Co.
Mark 273 — stabilizing antioxidant, Witco Chemical Co.
Irganox 1010 — hindered phenol antioxidant, Ciba-Geigy Corp.
Cyanox LTDP — DLTDP antioxidant synergist, American Cyanamid Tensile Strength: To demonstrate the effect of coupling on tensile strength and recovery after elongation, the following test was conducted. Five samples of compositions containing copolymers having various percent couplings as shown in Table II were formed into 1 inch wide (25.4 mm), 5 mil thick pieces. The less than 100% coupled samples were prepared by blending a composition based on a substantially 100% coupled copolymer with conventional diblock copolymers. These individual pieces were then placed in the Instron machine, noted earlier, and were elongated or pulled to a distance which represented an elongation equal to 40% (and in later tests, 80%) of its unstressed length, for a period or 30 seconds, then relaxed for 60 seconds, and then exposed to the same stress for 30 seconds. Data relative to the force of recovery or the individual samples were collected at the beginning of each pull and just prior to the end or each of the 30 second holding cycles. The maximum tensile strength was then measured at the beginning of the first cycle and the percent recovery calculated as follows:

$$\frac{\text{Tensile strength following the second 30 sec. holding cycle}}{\text{Tensile Maximum}} \times 100 = \% \text{ recovery}$$

TABLE II

| Percent Coupled S-I-S | Percent Recovery | Tensile Maximum |
|---|---|---|
| 100% | 78% | 32 grams |
| 90% | 73% | 27 grams |
| 80% | 73% | 26 grams |
| 70% | 67% | 24 grams |
| 60% | 64% | 21 grams |

Examples 1–5 will further have a tensile strength of at least 5 psi at 40% elongation at 25° C.

The results of the test, noted above, reveals that, as the amount of diblock increased relative to the total concentration of the block copolymer, the amount of recovery, as well as tensile strength decreased. Thus, a decrease in coupling efficiency may effect the present recovery performance and tensile strength of the foams of the present invention in nearly direct proportion to the amount of diblock which is present in the adhesive material making up the foam.

B) Preparation of elastomeric adhesive foams

EXAMPLE 1

An elastomeric adhesive foam may be prepared from the above compositions in the following manner:

A FoamMix® disk mixer such as shown and described in the above referenced U.S. Pat. No. 4,778,631 issued to Cobbs, Jr., et al., FIG. 5, is used to prepare the foam. The system includes a Model 6000 glue reciter, a Nordson 9400 Series FoamMix® unit, a H200 gun fitted with a shim 0.016" thick and 1.5" wide, and a laminating system such as previously described. The material unwind roll holds release paper.

The elastomeric adhesive material is supplied to the mixer at a pressure of 800 psi at an average flow rate into the mixer of 17.8 pounds per hour. Nitrogen gas at a temperature of 70° F. and a pressure of 2000 psi is added to the elastomeric adhesive material close to the adhesive material inlet of the disc mixer. The amount of the gas is 56 volume % (based on standard temperature and pressure), the addition being controlled via the gas metering valve and the differential pressure valve. The mixer is operated at about 275 rpm shaft rotation to form a solution of the gas in the adhesive material. The solution passes through the mixer, outlet, and connecting line and is dispensed through a dispensing nozzle. The pressure at the nozzle is 515 psi. The temperature of the gas/adhesive material solution exiting the mixer is 325° F. (all temperature controls are set to 325° F.). The overall flow rate of the solution from the mixer is approximately the same as the adhesive material flow rate because of the low mass of the gas.

A line speed of 50 ft/min resulting in a solution add on of 0.15 g/in2 is used. The web temperature leaving the chill roll is 130° F.

The resulting product will be a homogeneous adhesive foam. The foam has a caliper of 18 mils and a width of 1.5 inches. The nitrogen gas content of the foam will be about 46%.

EXAMPLE 2

An elastomeric adhesive foam may be prepared from the above compositions in the following manner:

A FoamMix® disk mixer such as shown and described in the above referenced U.S. Pat. No. 4,778,631 issued to Cobbs, Jr., et al., FIG. 5, is used to prepare the foam. The system includes a Model 6000 glue reciter, a Nordson 9400 Series FoamMix® unit, a H-20LBS gun fitted with a 1.5" slot nozzle having a 0.006" shim and a 0.015" land, and a laminating system such as previously described. The material unwind roll holds release paper.

The elastomeric adhesive material is supplied to the mixer at a pressure of 1940 psi at an average flow rate into the mixer of 25.6 pounds per hour. Nitrogen gas at a temperature of 70° F. and a pressure of 2200 psi is added to the elastomeric adhesive material close to the adhesive material inlet of the disc mixer. The amount of the gas is 72 volume % (based on standard temperature and pressure), the addition being controlled via the gas metering valve and the is differential pressure valve. The mixer is operated at about 275 rpm shaft rotation to form a solution of the gas in the adhesive material. The solution passes through the mixer, outlet, and connecting line and is dispensed through a dispensing nozzle. The pressure at the nozzle is 1830 psi. The temperature of the gas/adhesive material solution exiting the mixer is 375° F. (all temperature controls are set to 375° F.). The overall flow rate or the solution from the mixer is approximately the same as the adhesive material flow rate because of the low mass of the gas.

A line speed of 112 ft/min resulting in a solution add on of 0.085 g/in2 is used.

The resulting product will be a homogeneous adhesive foam. The foam has a caliper of 19 mils and a width of 1.5 inches. The nitrogen gas content of the foam will be about 71%.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A disposable garment comprising:

a liquid pervious topsheet;

a liquid impervious backsheet joined to said topsheet;

an absorbent core positioned between said topsheet and said backsheet; and an elastic feature comprising an elastomeric adhesive foam positioned between said backsheet and said topsheet; said elastomeric adhesive foam comprising an elastomeric, hot-melt, adhesive material having cells; said adhesive material comprising:
    (a) an A-B-A block copolymer, wherein the A block is an alkenylarene polymer and the B block is selected from the group consisting of (i) a polymer of a 4 to 6 carbon conjugated aliphatic diene and (ii) a polymer of a linear 2 to 6 carbon alkene;
    (b) an aromatic modified hydrocarbon resin which associates with both the A blocks and the B block of said copolymer, said resin being a single resin vehicle selected from the group consisting of aromatic petroleum hydrocarbon resins and hydrogenated versions of aromatic petroleum hydrocarbon resins; and
    (c) optionally a processing oil.

2. The disposable garment of claim 1 wherein the A block of said copolymer comprises styrene and the B block of said copolymer comprises butadiene or isoprene.

3. The disposable garment of claim 2 wherein said copolymer has a styrene content of about 15% to about 50% of the total weight of the copolymer.

4. The disposable garment of claim 3 wherein said copolymer is substantially fully coupled.

5. The disposable garment of claim 1 wherein said adhesive material of said foam comprises about 15 weight % to about 60 weight % of said copolymer; about 30 weight % to about 70 weight % of said aromatic modified hydrocarbon resin; and up to about 30 weight % of said processing oil.

6. The disposable garment of claim 5 wherein said adhesive material additionally comprises up to about 1 weight % of a stabilizer.

7. The disposable garment of claim 6 wherein said adhesive material comprises:
   (a) about 45 weight % of said copolymer, said copolymer being a substantially fully coupled, styrene-isoprene-styrene block copolymer having a styrene content of about 15% to about 50% of the total weight of the copolymer;
   (b) about 40 weight % of said aromatic modified hydrocarbon resin;
   (c) about 14 weight % of said processing oil; and
   (d) about 1 weight % of said stabilizer.

8. The disposable garment of claim 1 wherein said elastic feature is an elastomeric member of an elasticized waistband.

9. The disposable garment of claim 1 wherein said elastic feature is an elastic side panel member.

10. The disposable garment of claim 1 wherein said elastic feature is a leg elastic.

11. A disposable garment comprising:
    (i) a nonwoven coverstock having a body facing side and a garment facing side;
    (ii) a liquid impervious backsheet joined to said body facing side of said coverstock;
    (iii) an elastic feature comprising an elastomeric adhesive foam positioned between said backsheet and said coverstock;
    (iv) a liquid pervious topsheet joined to said backsheet; and
    (v) an absorbent core positioned between said topsheet and said backsheet;

said elastomeric adhesive foam of said elastic feature comprising an elastomeric, hot-melt, adhesive material having cells; said adhesive material comprising:
    (a) an A-B-A block copolymer, wherein the A block is an alkenylarene polymer and the B block is selected from the group consisting of (i) a polymer of a 4 to 6 carbon conjugated aliphatic diene and (ii) a polymer of a linear 2 to 6 carbon alkene;
    (b) an aromatic modified hydrocarbon resin which associates with both the A blocks and the B block of said copolymer, said resin being a single resin vehicle selected from the group consisting of aromatic petroleum hydrocarbon resins and hydrogenated versions of aromatic petroleum hydrocarbon resins; and
    (c) optionally a processing oil.

12. The disposable garment of claim 11 wherein the A block of said copolymer comprises styrene and the B block of said copolymer comprises butadiene or isoprene.

13. The disposable garment of claim 12 wherein said copolymer has a styrene content of about 15% to about 50% of the total weight of the copolymer.

14. The disposable garment of claim 13 wherein said copolymer is substantially fully coupled.

15. The disposable garment of claim 14 wherein said adhesive material of said foam comprises about 15 weight % to about 60 weight % of said copolymer; about 30 weight % to about 70 weight % of said aromatic modified hydrocarbon resin; and up to about 30 weight % of said processing oil.

16. The disposable garment of claim 15 wherein said adhesive material additionally comprises up to about 1 weight % of a stabilizer.

17. The disposable garment of claim 16 wherein said adhesive material of said foam comprises:
   (a) about 45 weight % of said copolymer, said copolymer being a substantially fully coupled, styrene-isoprene-styrene block copolymer having a styrene content of about 15% to about 50% of the total weight of the copolymer;
   (b) about 40 weight % of said aromatic modified hydrocarbon resin;
   (c) about 14 weight % of said processing oil; and
   (d) about 1 weight % of said stabilizer.

18. A disposable garment comprising:
   (i) a nonwoven coverstock having a body facing side, a garment facing side, and a liquid pervious zone;
   (ii) a liquid pervious topsheet having a body facing side and a garment facing side joined to said body facing side of said coverstock;
   (iii) an elastic feature comprising an elastomeric adhesive foam having a liquid pervious zone positioned between said coverstock; and said topsheet;
   (iv) a liquid impervious backsheet joined to said garment facing side of said coverstock; and
   (v) an absorbent core positioned between said coverstock and said backsheet;

said liquid pervious zone of said coverstock and said elastic feature being positioned so as to allow fluids to pass from said body facing side of said topsheet to said absorbent core;

said elastomeric adhesive foam of said elastic feature comprising an elastomeric, hot-melt, adhesive material having cells; said adhesive material comprising:
   (a) an A-B-A block copolymer, wherein the A block is an alkenylarene polymer and the B block is selected from the group consisting of (i) a polymer of a 4 to 6 carbon conjugated aliphatic diene and (ii) a polymer of a linear 2 to 6 carbon alkene;
   (b) an aromatic modified hydrocarbon resin which associates with both the A blocks and the B block of said copolymer, said resin being a single resin vehicle selected from the group consisting of aromatic petroleum hydrocarbon resins and hydrogenated versions of aromatic petroleum hydrocarbon resins; and
   (c) optionally a processing oil.

19. The disposable garment of claim 18 wherein the A block of said copolymer comprises styrene and the B block of said copolymer comprises butadiene or isoprene.

20. The disposable garment of claim 19 wherein said copolymer has a styrene content of about 15% to about 50% of the total weight of the copolymer.

21. The disposable garment of claim 20 wherein said copolymer is substantially fully coupled.

22. The disposable garment of claim 21 wherein said adhesive material of said foam comprises about 15 weight % to about 60 weight % of said copolymer; about 30 weight % to about 70 weight % of said aromatic modified hydrocarbon resin; and up to about 30 weight % of said processing oil.

23. The disposable garment of claim 22 wherein said adhesive material additionally comprises up to about 1 weight % of a stabilizer.

24. The disposable garment of claim 23 wherein said adhesive material of said foam comprises:
   (a) about 45 weight % of said copolymer, said copolymer being a substantially fully coupled, styrene-isoprene-styrene block copolymer having a styrene content of about 15% to about 50% of the total weight of the copolymer;
   (b) about 40 weight % of said aromatic modified hydrocarbon resin;
   (c) about 14 weight % of said processing oil; and
   (d) about 1 weight % of said stabilizer.

25. The disposable garment of claim 18 further comprising a second nonwoven coverstock having a liquid pervious zone joined to said body facing side of said topsheet, said liquid pervious zone being positioned so as to allow fluids to pass from said body facing side of said topsheet to said absorbent core.

* * * * *